(12) United States Patent
Cha et al.

(10) Patent No.: US 11,460,888 B2
(45) Date of Patent: Oct. 4, 2022

(54) SLIDABLE DISPLAY DEVICE HAVING FLEXIBLE DISPLAY

(71) Applicant: LG ELECTRONICS INC., Seoul (KR)

(72) Inventors: Youngdo Cha, Seoul (KR); Jinyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 17/086,968

(22) Filed: Nov. 2, 2020

(65) Prior Publication Data

US 2022/0066510 A1    Mar. 3, 2022

(30) Foreign Application Priority Data

Aug. 27, 2020  (WO) ................ PCT/KR2020/011500

(51) Int. Cl.
    *G06F 1/16*    (2006.01)
(52) U.S. Cl.
    CPC .......... *G06F 1/1652* (2013.01); *G06F 1/1624* (2013.01)
(58) Field of Classification Search
    CPC .... G06F 1/1652; G06F 1/1624; G06F 1/1681; H04M 1/0237; H04M 1/0268; H04M 1/0235; G09F 9/301
    See application file for complete search history.

(56) References Cited

U.S. PATENT DOCUMENTS

| | | | |
|---|---|---|---|
| 2009/0279234 A1* | 11/2009 | Lee .................... | B29C 45/14311 361/679.01 |
| 2012/0127641 A1* | 5/2012 | Seo ..................... | H04M 1/0237 361/679.01 |
| 2018/0103550 A1 | 4/2018 | Seo et al. | |
| 2019/0261519 A1* | 8/2019 | Park .................. | G02F 1/133305 |
| 2021/0044683 A1* | 2/2021 | He .................... | B29C 45/14311 361/679.01 |

FOREIGN PATENT DOCUMENTS

| | | |
|---|---|---|
| KR | 1020190077292 | 7/2019 |
| KR | 1020190086305 | 7/2019 |
| KR | 1020190119719 | 10/2019 |
| KR | 1020200099455 | 8/2020 |

OTHER PUBLICATIONS

PCT International Application No. PCT/KR2020/011500, International Search Report dated May 24, 2021, 3 pages.

* cited by examiner

*Primary Examiner* — James Wu
(74) *Attorney, Agent, or Firm* — Lee, Hong, Degerman, Kang & Waimey PC

(57) ABSTRACT

A flexible display device is disclosed. The flexible display device includes a first body, a second body, a flexible display, and a lubrication rail. The lubrication rail is made of self-lubricating engineering plastic, and is provided as a pair of lubrication rails. When the first body and the second body move relative to each other, a surface of the lubrication rail significantly reduces friction that occurs in a contact portion between the first body and the second body.

18 Claims, 20 Drawing Sheets

[FIG. 1]
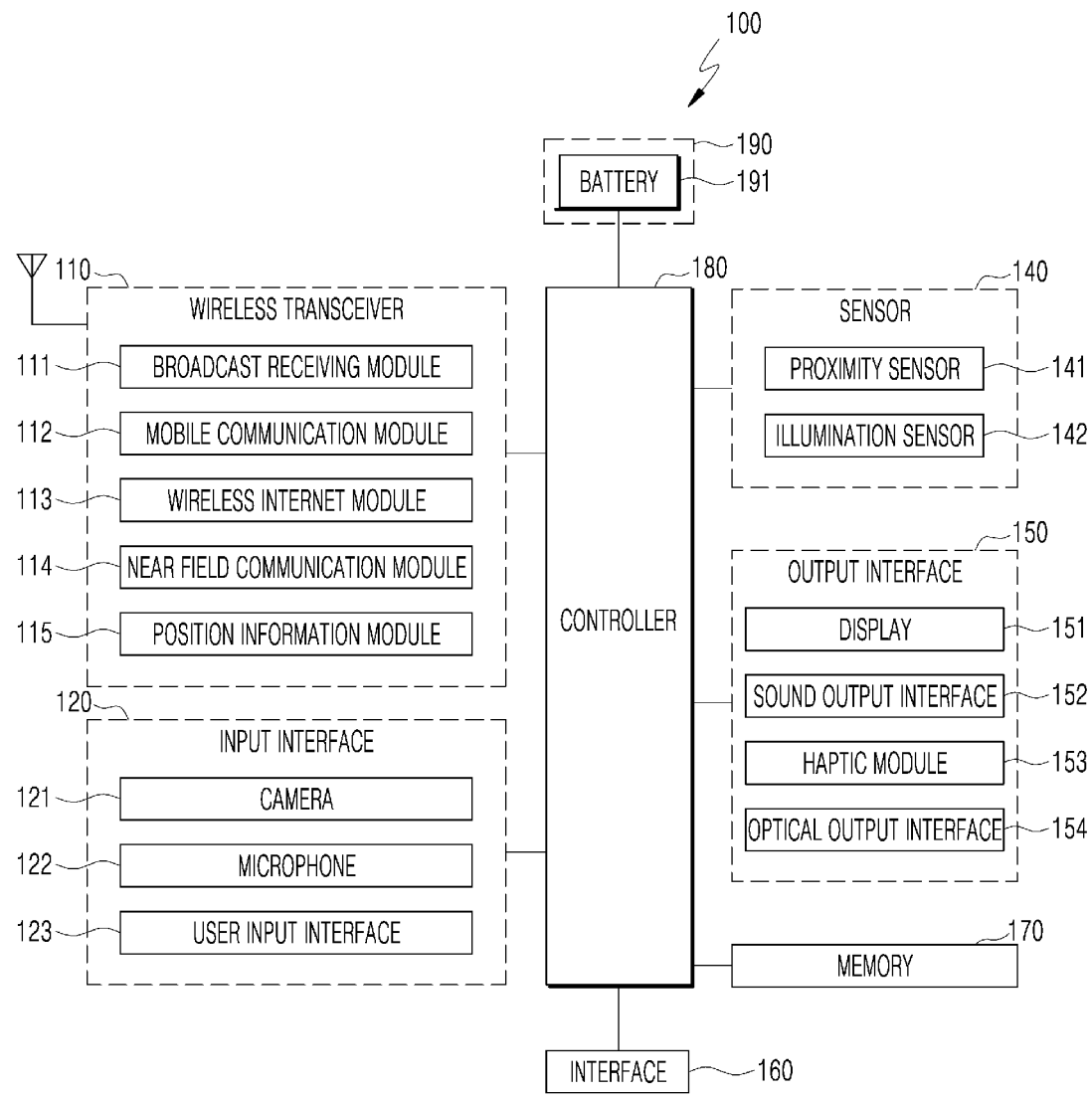

[FIG. 2a]
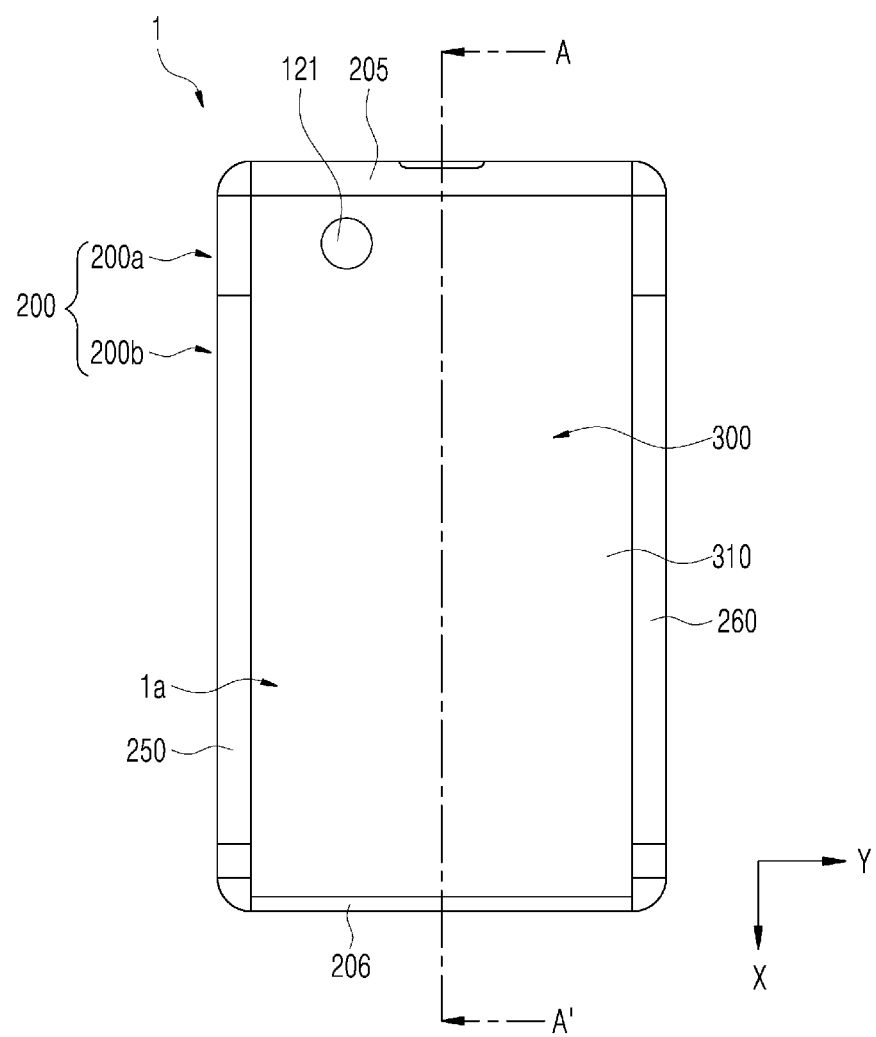

[FIG. 2b]
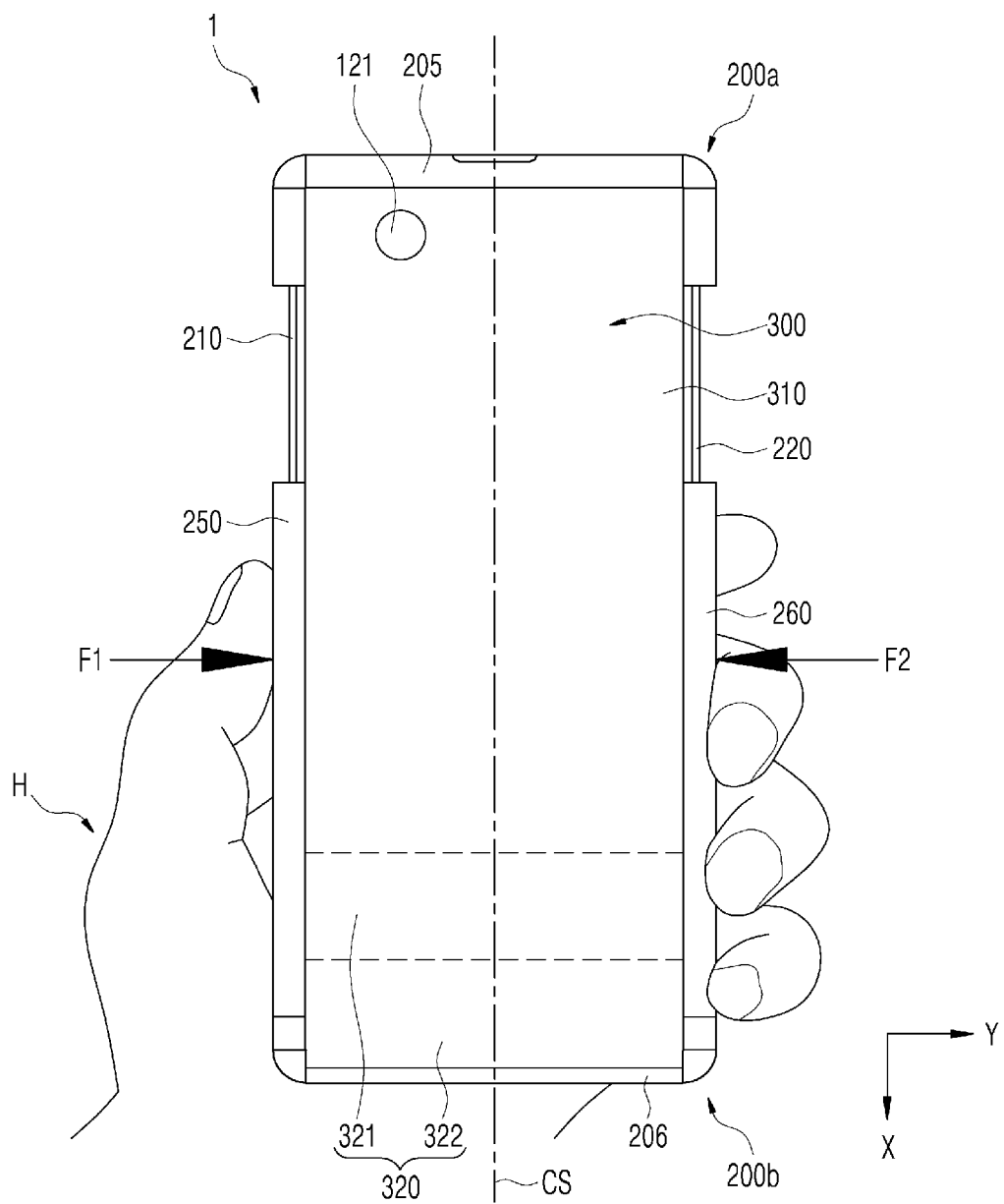

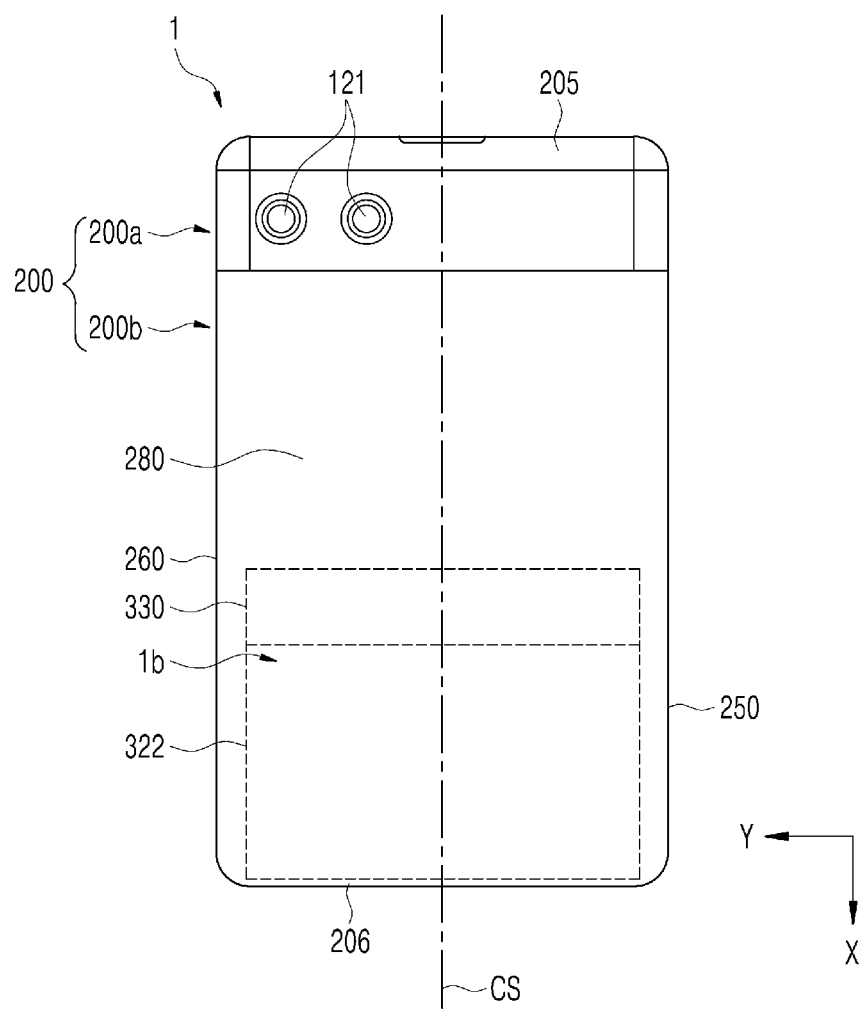
[FIG. 3a]

[FIG. 3b]
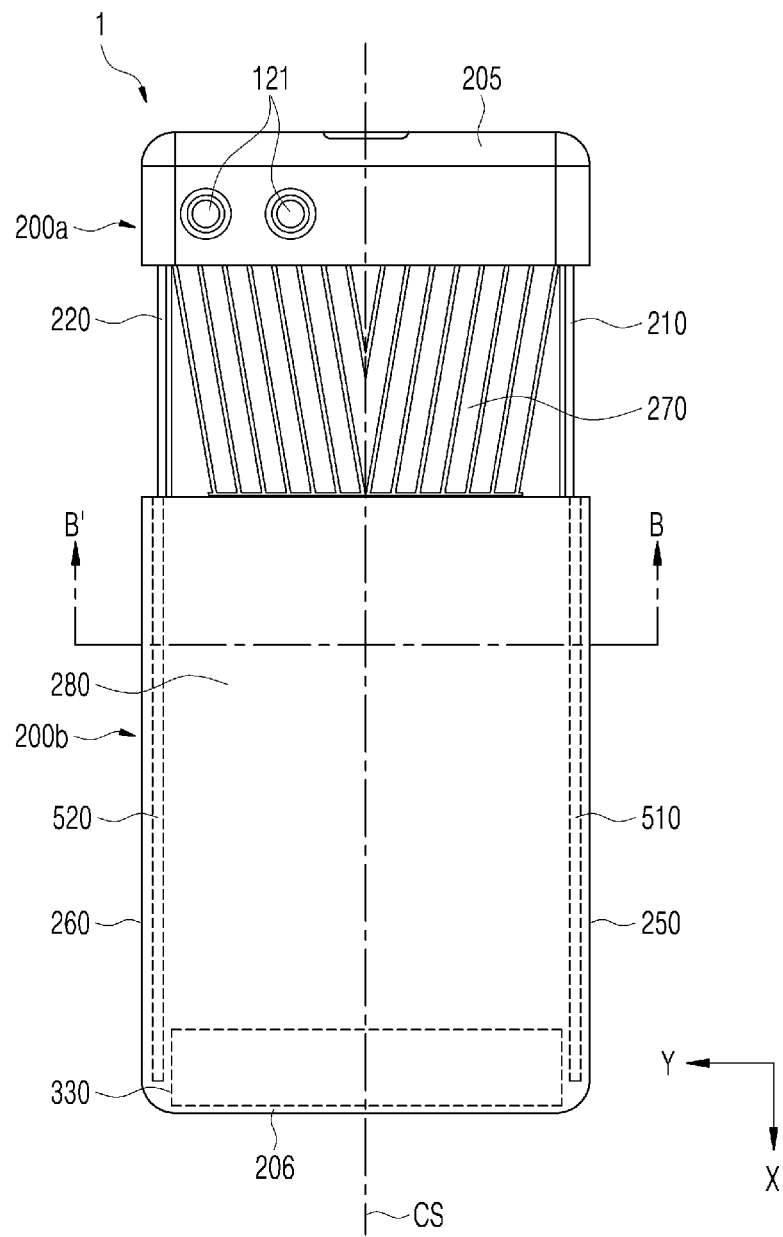

[FIG. 4]
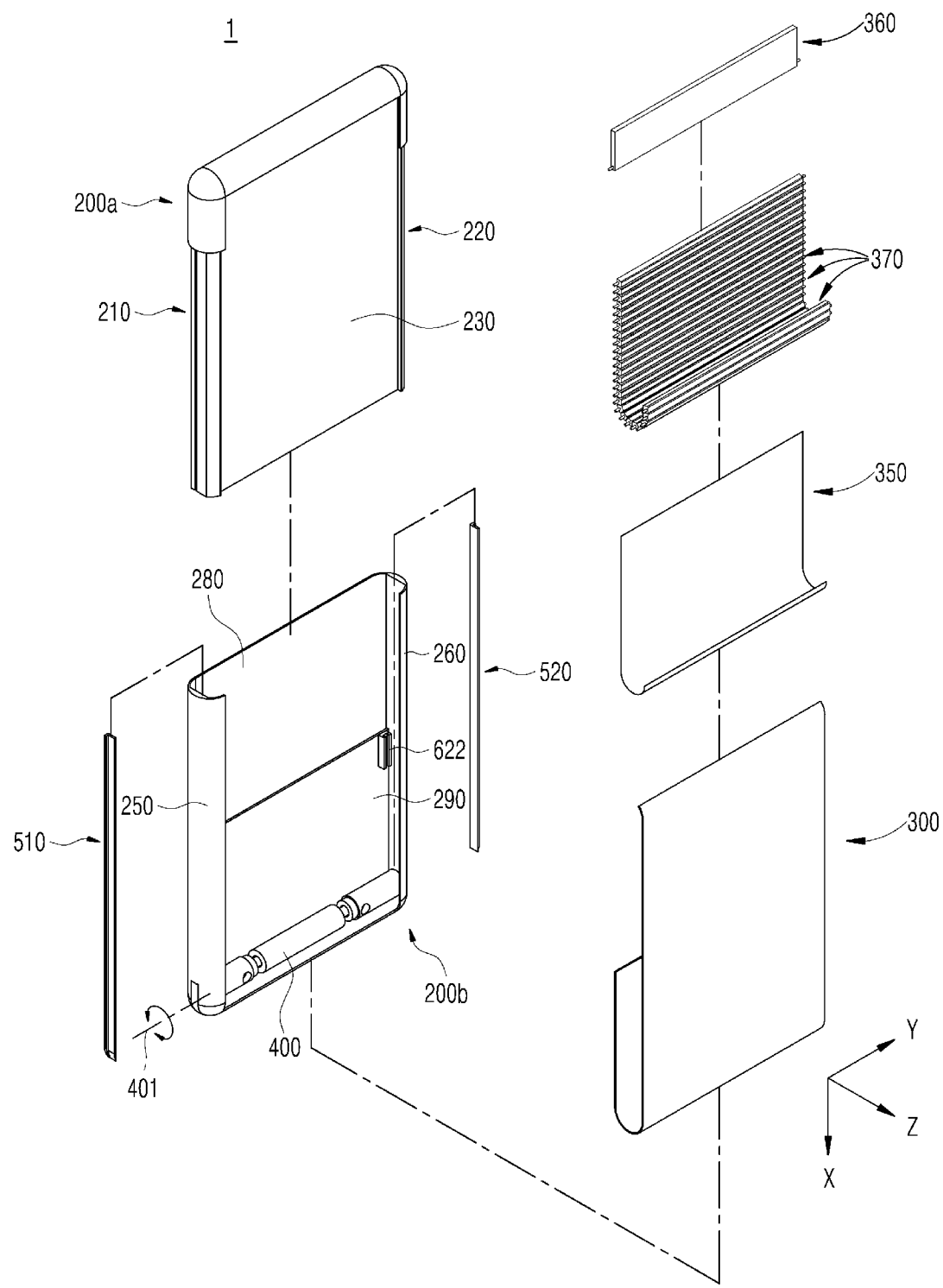

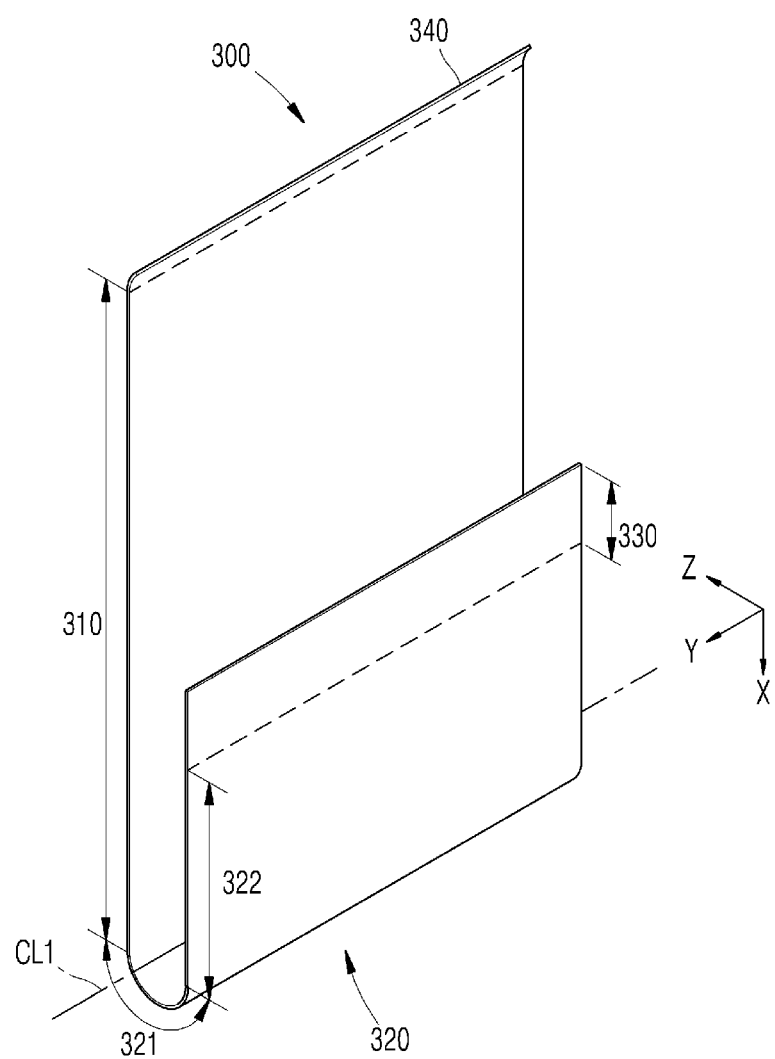
[FIG. 5a]

[FIG. 5b]
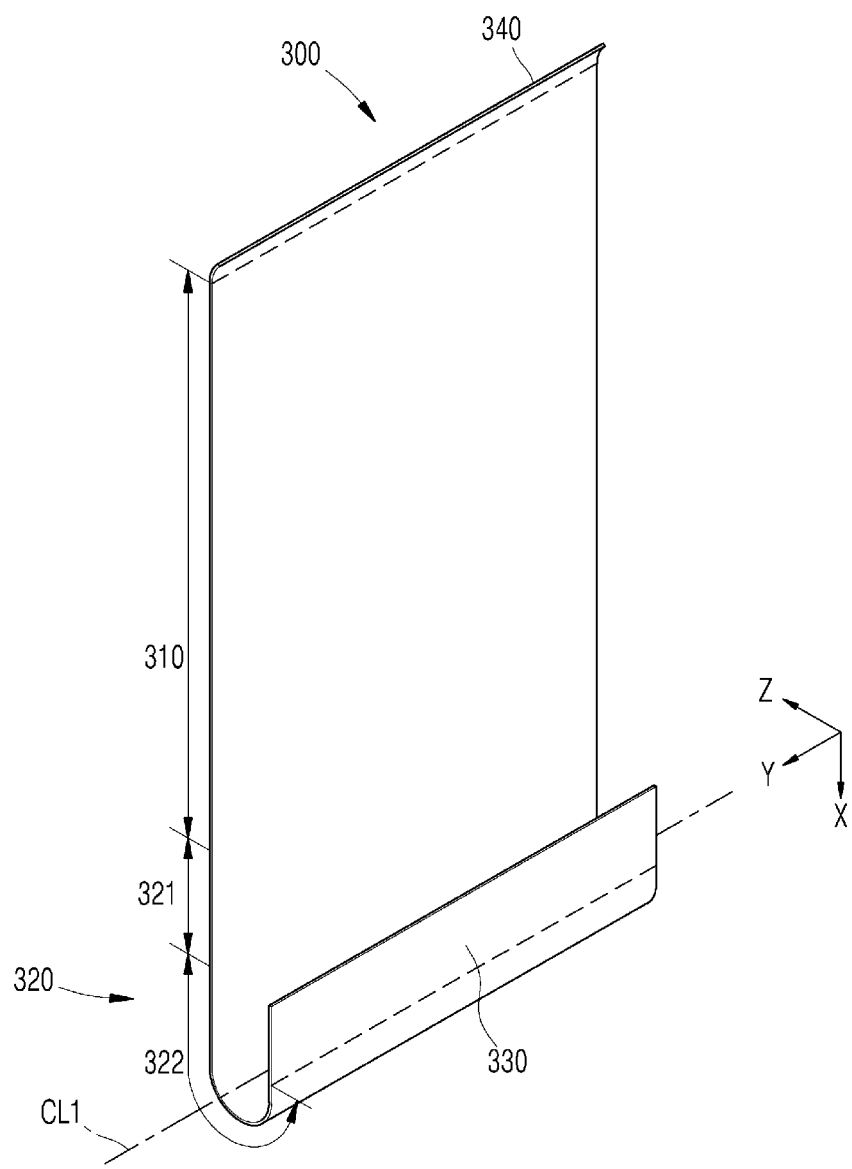

[FIG. 6a]
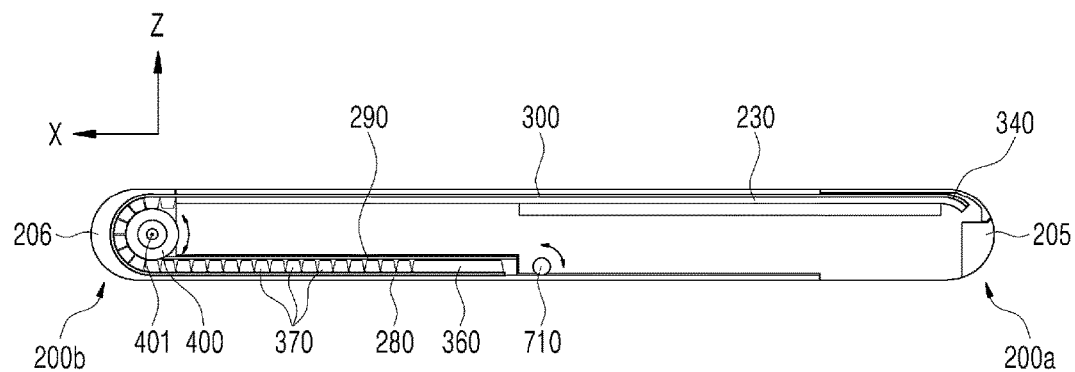
[FIG. 6b]
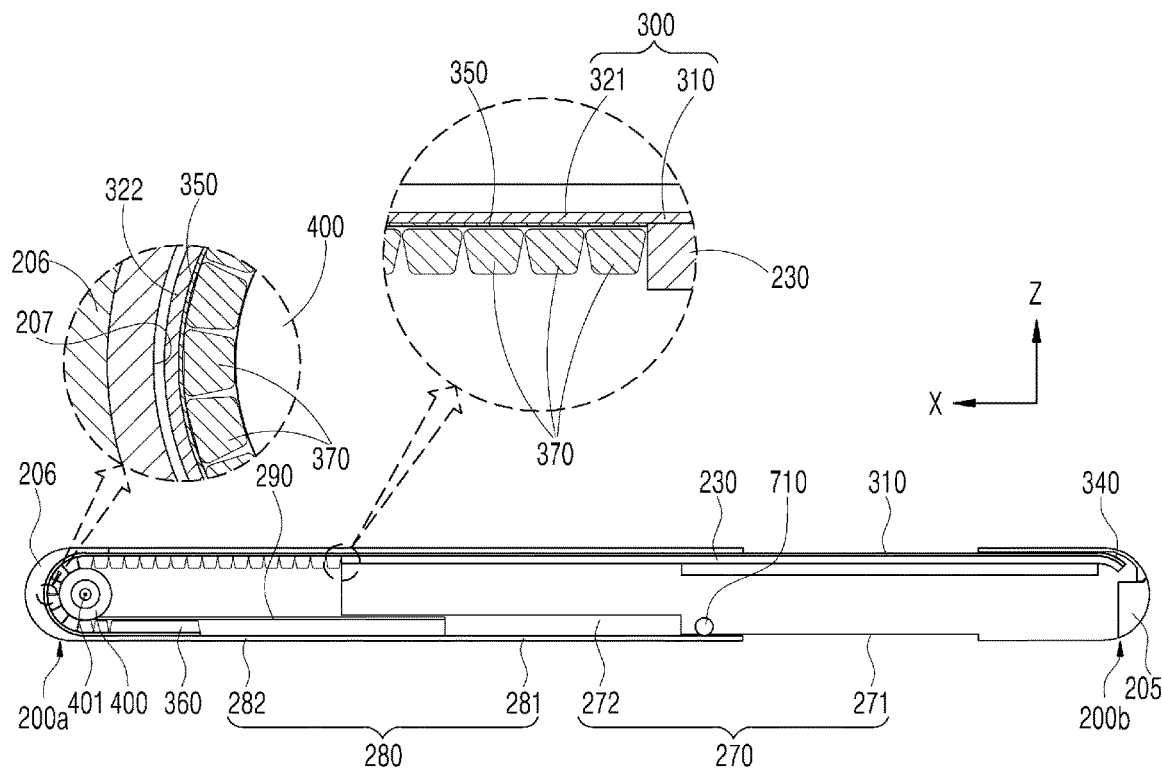

[FIG. 7a]
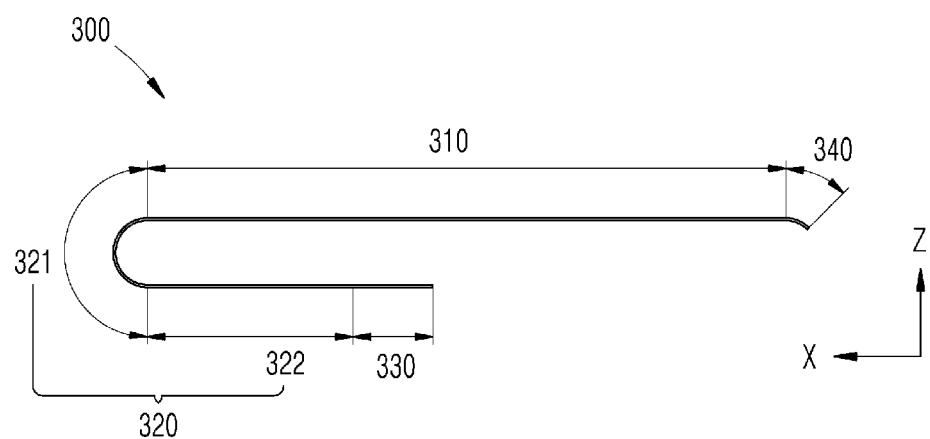
[FIG. 7b]
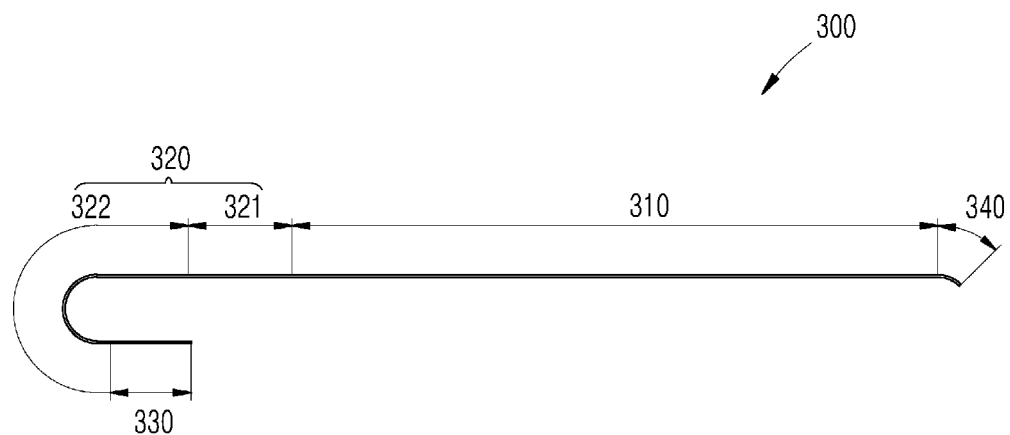

[FIG. 8a]
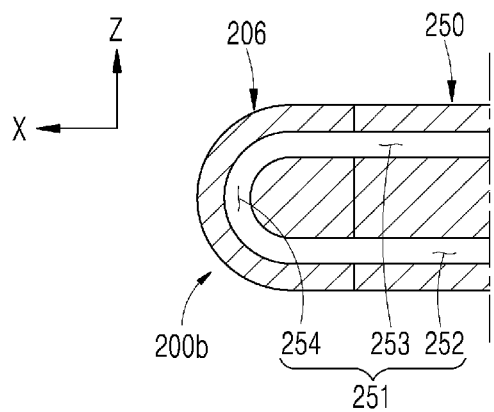
[FIG. 8b]
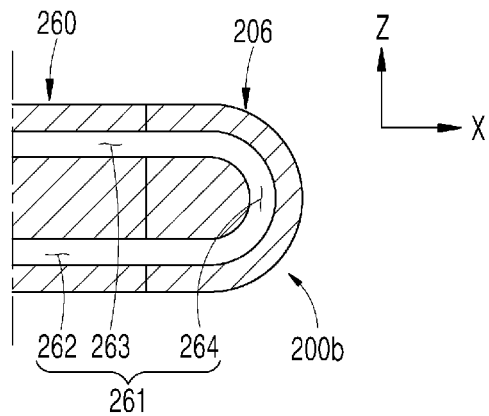
[FIG. 9]
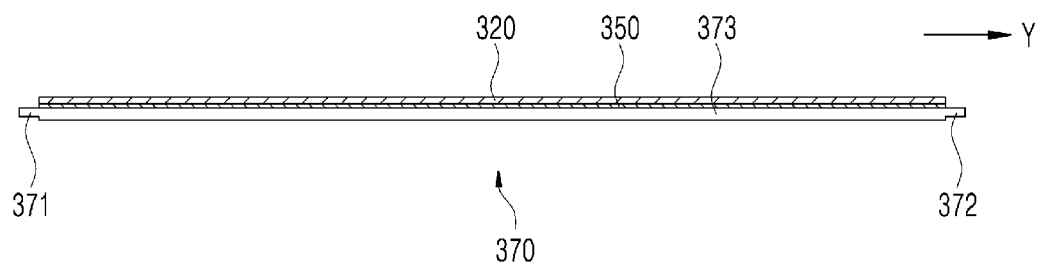

[FIG. 10a]
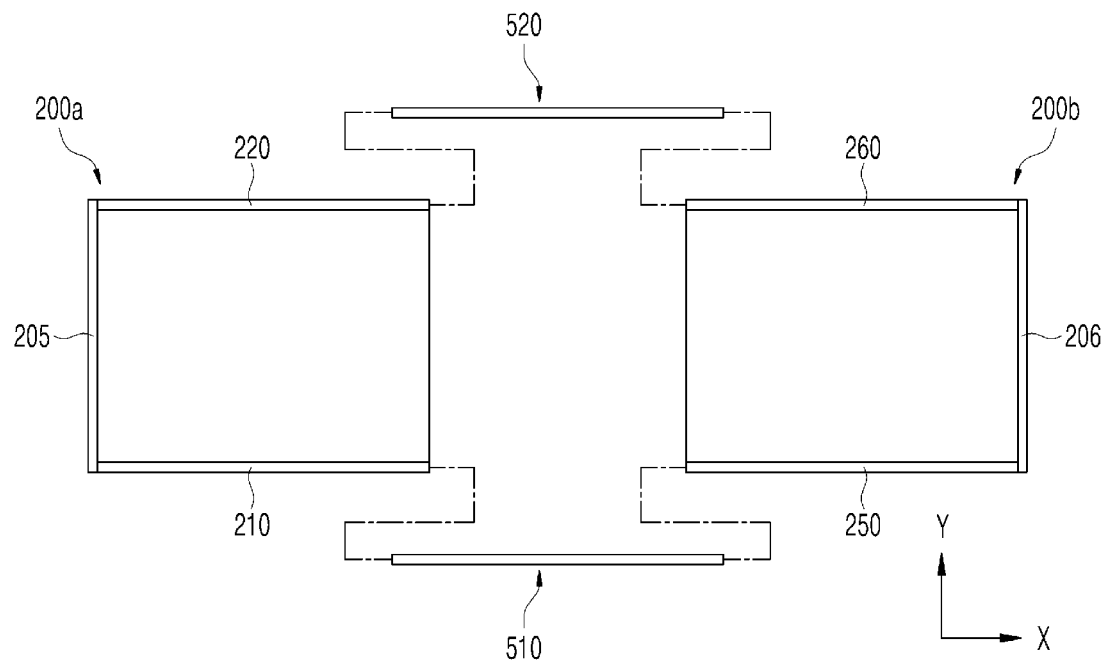
[FIG. 10b]
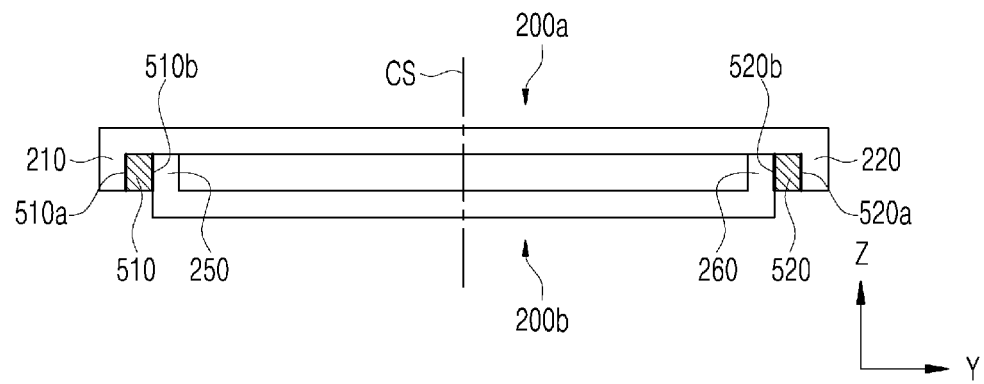

[FIG. 10c]
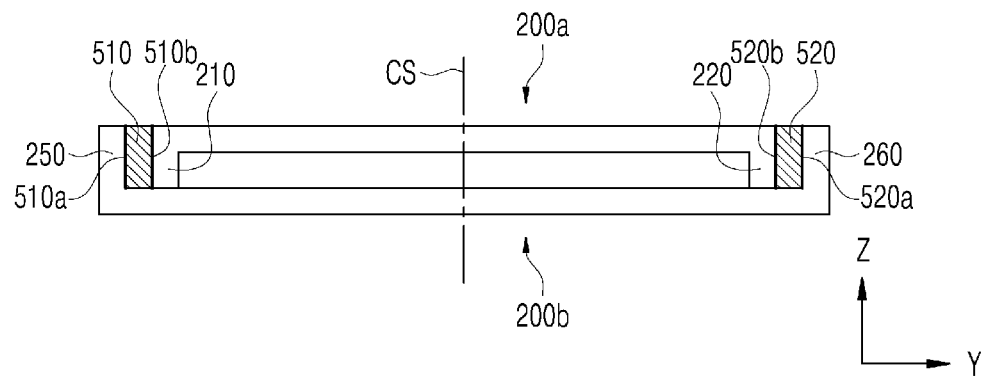
[FIG. 11]
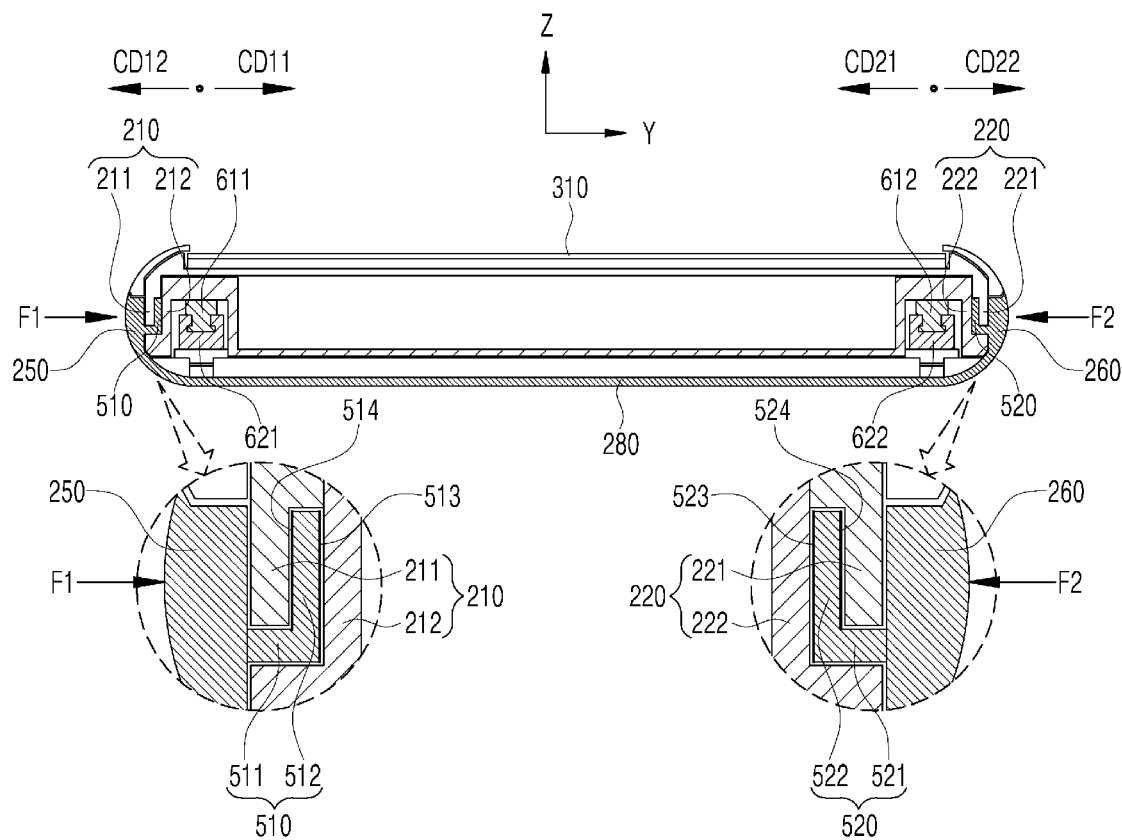

[FIG. 12a]
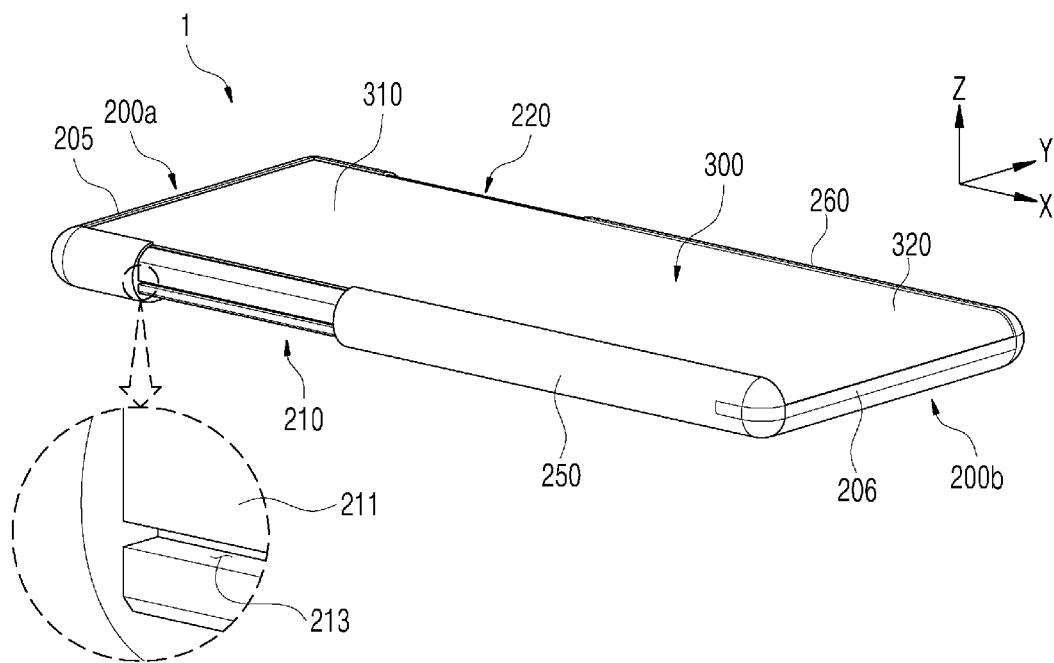
[FIG. 12b]
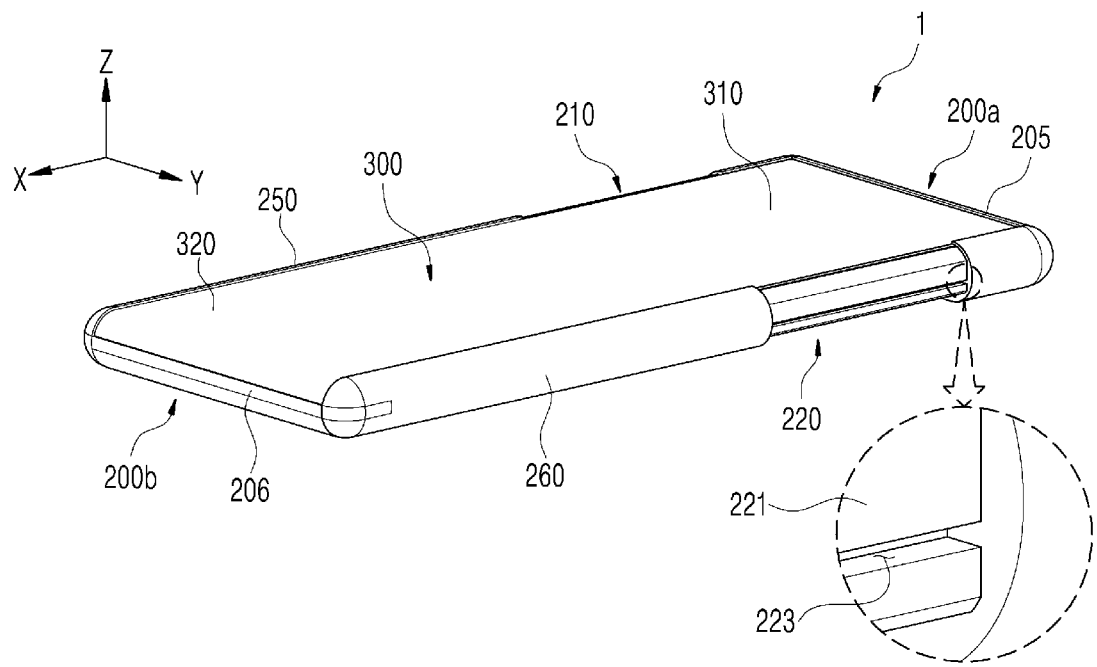

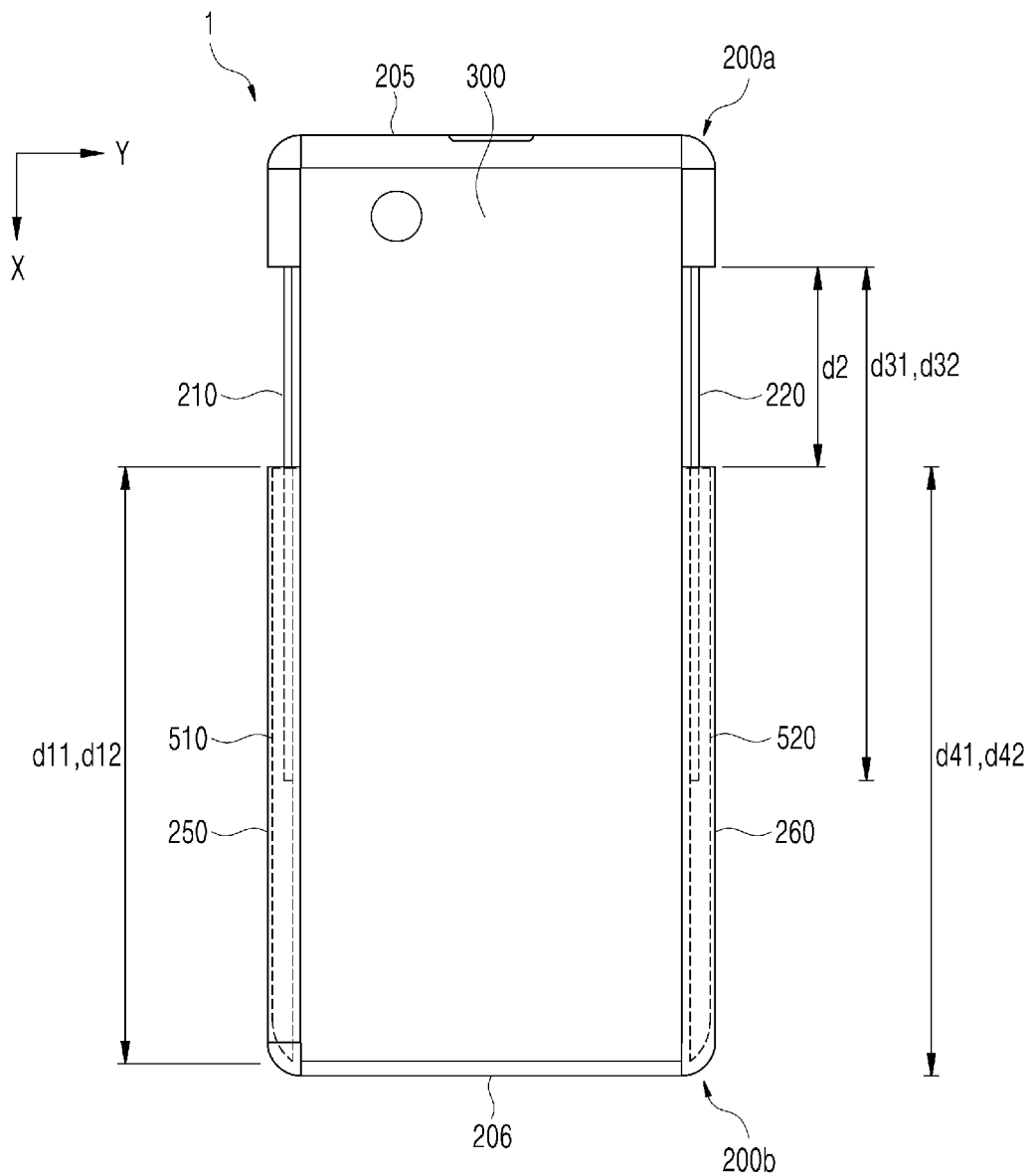
[FIG. 13]

[FIG. 14a]
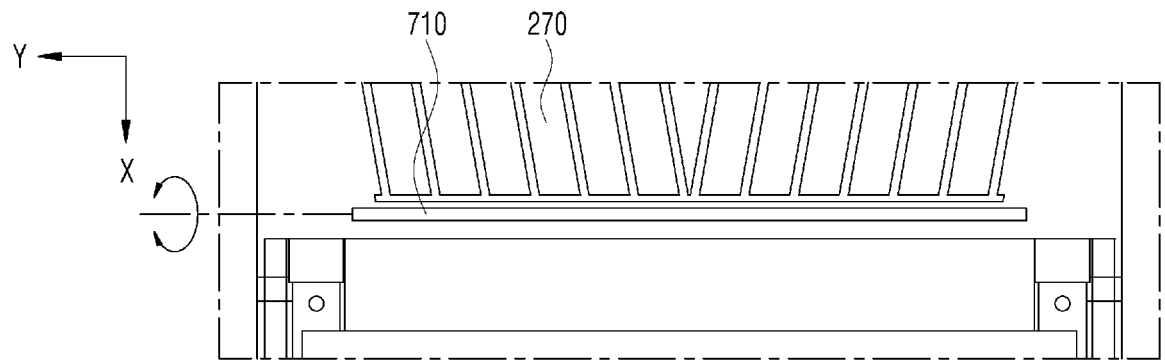
[FIG. 14b]
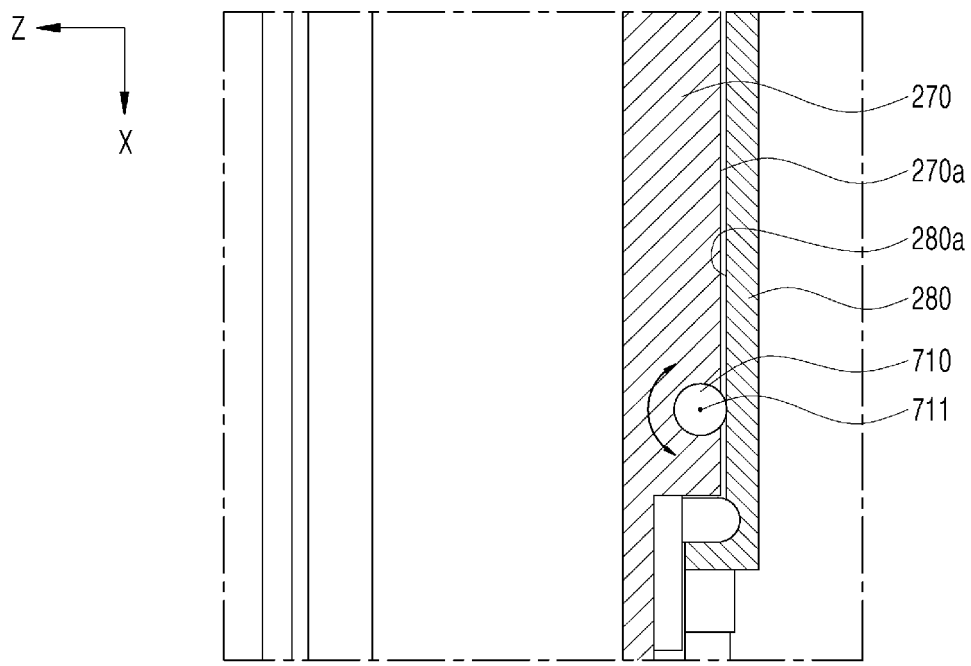

[FIG. 15a]
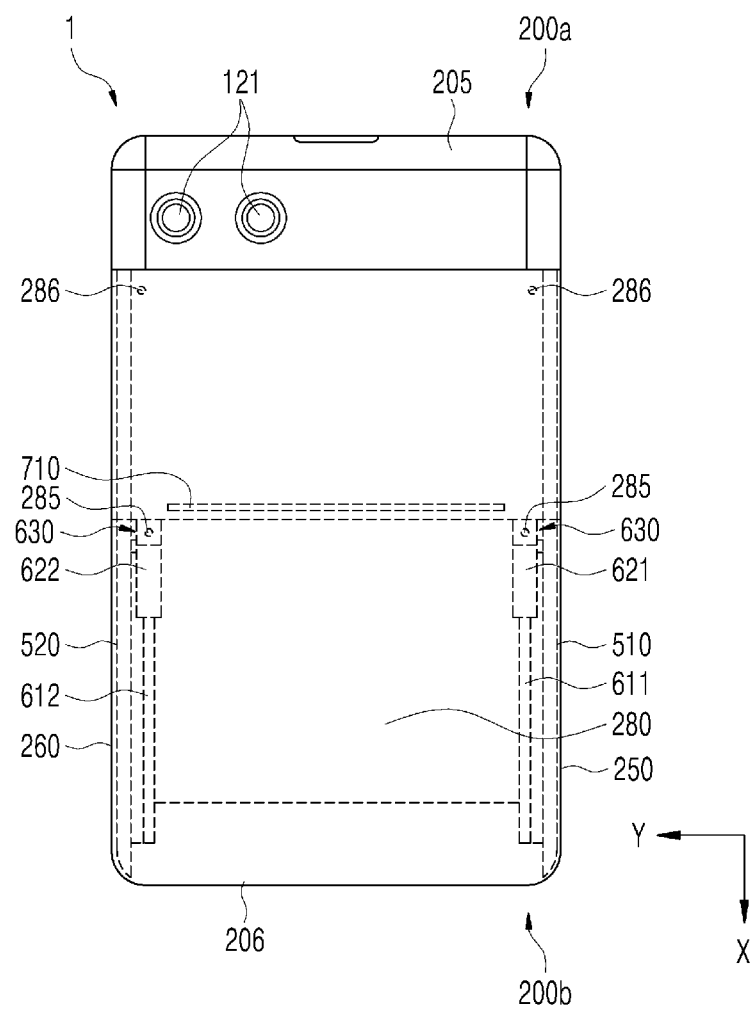

[FIG. 15b]
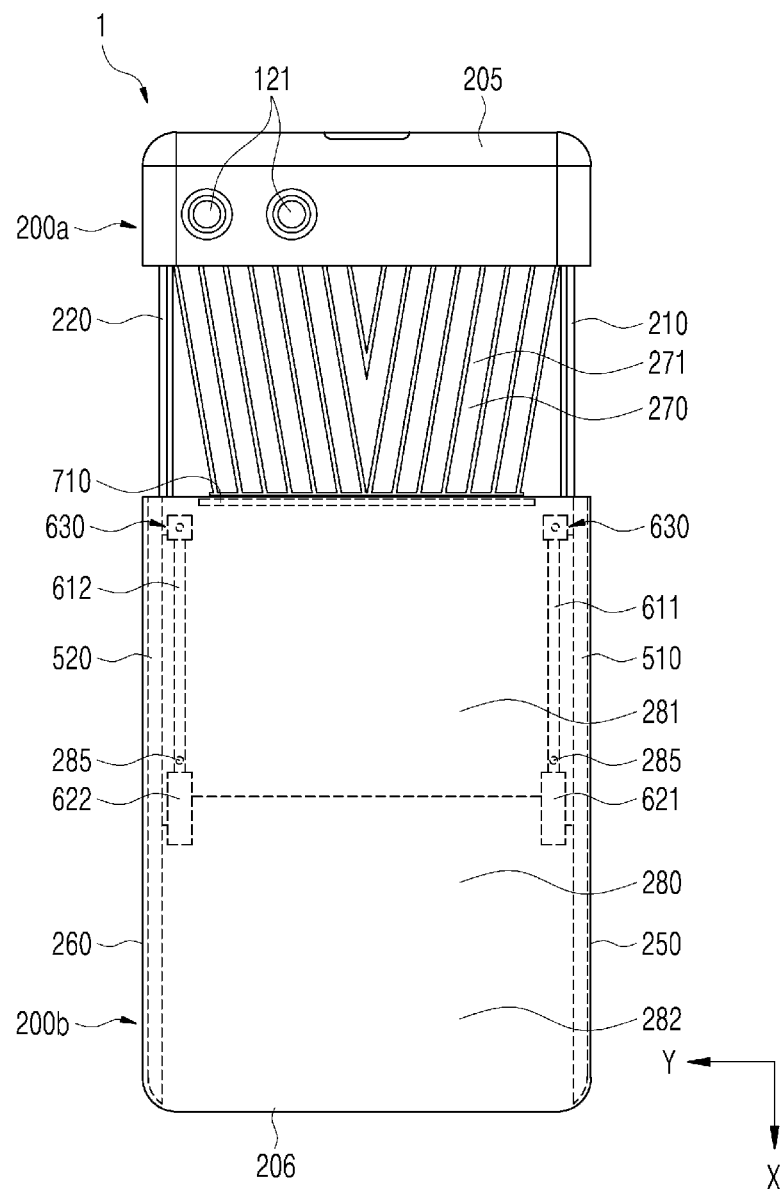

[FIG. 16a]
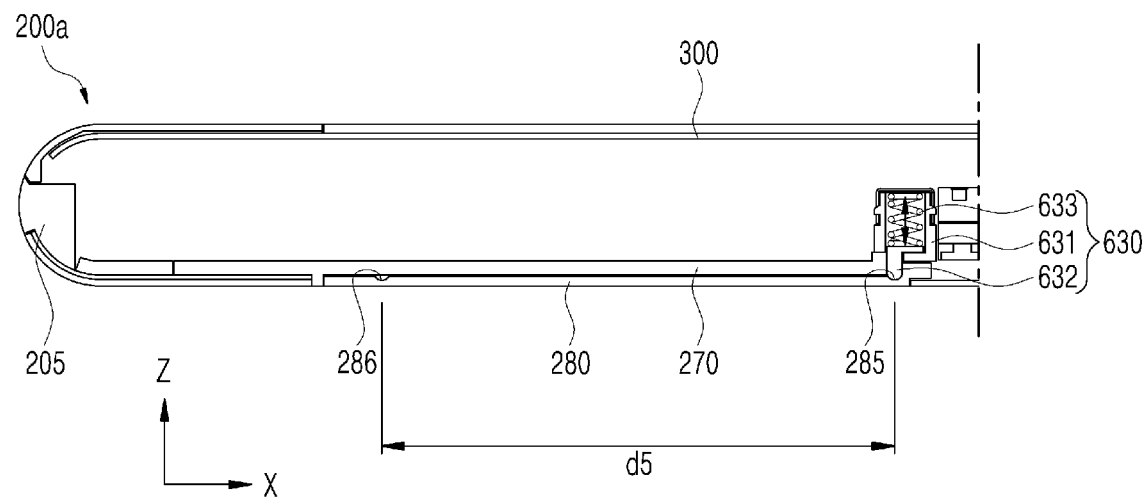
[FIG. 16b]
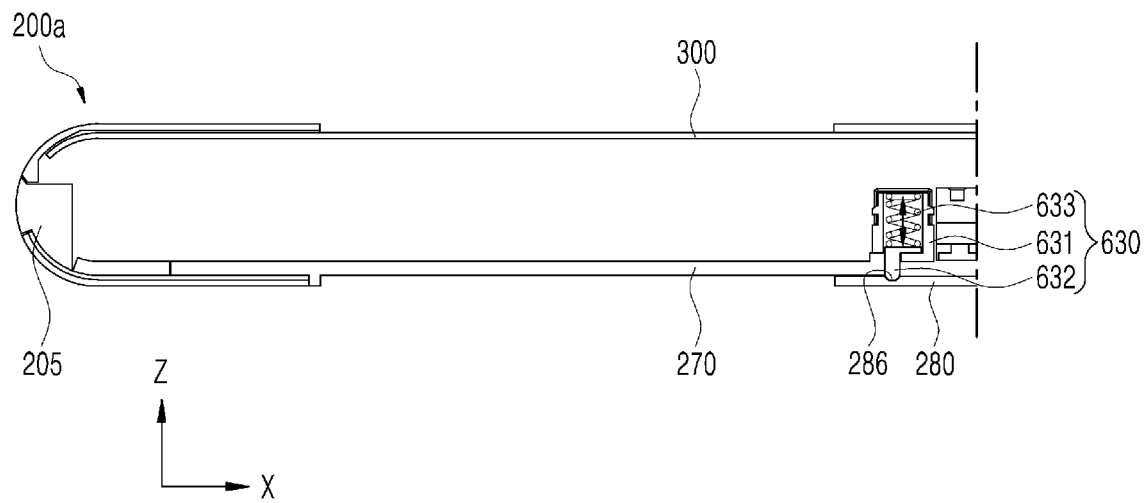

[FIG. 17]
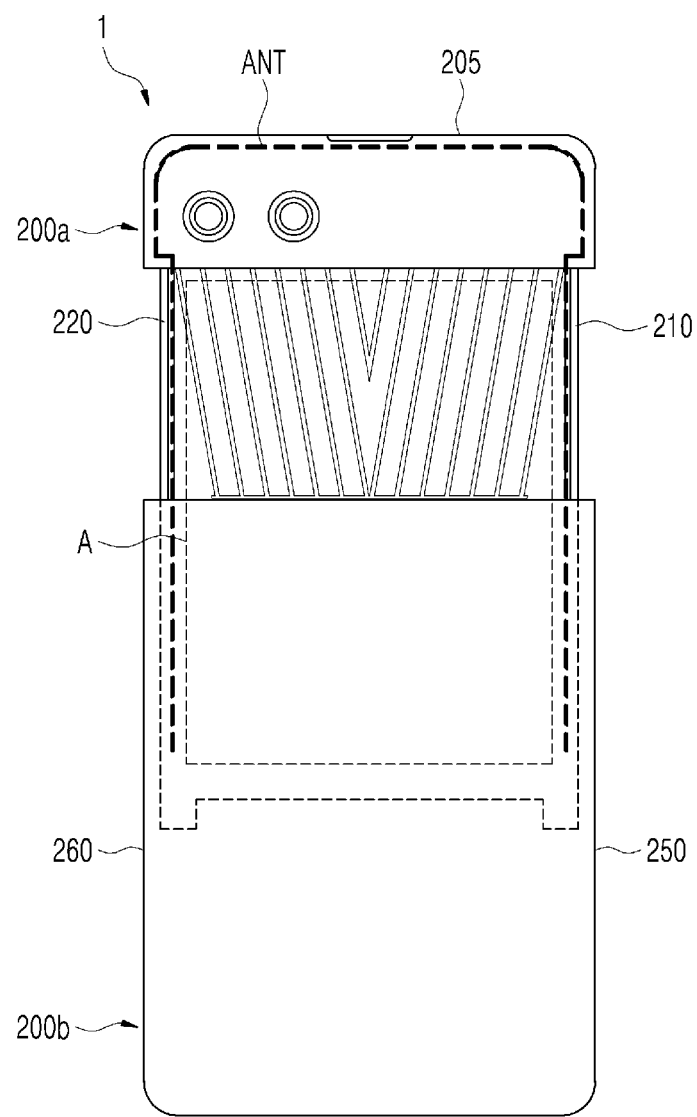

SLIDABLE DISPLAY DEVICE HAVING FLEXIBLE DISPLAY

CROSS-REFERENCE TO RELATED APPLICATION

Pursuant to 35 U.S.C. § 119, this application claims the benefit of an earlier filing date and right of priority to International Application No. PCT/KR2020/011500, filed on Aug. 27, 2020, the contents of which are hereby incorporated by reference herein in its entirety.

FIELD

The present disclosure relates to a device including a flexible display and, more particularly, to a portable device including a flexible display characterized in that the size of the device is changed as two bodies slide with respect to each other.

BACKGROUND

Various devices using a flexible display that can be bent while displaying image information have been developed and introduced.

Such a flexible display has been applied to mobile terminals such as mobile phones, smart phones, etc., and users can carry such mobile terminals and use them in various places.

Representative examples of mobile devices to which a flexible display is applied are as follows.

Firstly, research and development has been underway for foldable devices having a structure in which a flexible display is applied to two bodies that are connected to each other by a folding structure (e.g., by a hinge). In such foldable devices, since the flexible display may be disposed to completely cover the two bodies and the folding structure, a relatively large-sized display can be implemented in the devices.

As another example of devices using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

As still another example of devices using a flexible display, there are devices in which as two bodies slide with respect to each other, a flexible display having a U-shape due to a curved middle portion thereof is deformed such that the surface area of the flexible display seen from one side thereof changes.

When using such a device in which the flexible display is deformed as two the bodies slide with respect to each other, the user may move one of the two bodies (hereinafter referred to as a "moving body") while gripping the other of the two bodies (hereinafter referred to as a "fixed body"). Here, friction occurring between the moving body and the fixed body may increase depending on the force applied by a hand of the user gripping the device.

In particular, the user may grip the fixed body on both left and right sides of a moving direction of the moving body with respect to the fixed body. Here, friction occurring between the moving body and the fixed body may be significantly increased by the gripping force of the user applied towards the center of the device from both left and right sides of the device.

Accordingly, if such friction occurring between the fixed body and the moving body is not reduced, the device may not be normally operated, and scratching or other damage may occur in a portion of the device at which the fixed body and the moving body contact each other.

Also, if unequal forces are applied on both left and right sides of the moving direction of the moving body due to the friction occurring between the fixed body and the moving body when the flexible display is deformed as the moving body moves with respect to the fixed body, the flexible display may be damaged.

Meanwhile, such a device in which the flexible display is deformed as two the bodies slide with respect to each other may be kept for a relatively long time with a middle portion of the flexible display forming a U-shape.

Here, when the moving body moves with respect to the fixed body, the U-shaped middle portion of the flexible display may not be fully spread out, and a flat portion of the flexible display may not be completely curved into a U-shape. These deficiencies may be because of plastic deformation occurring in a part of the flexible display, springback, and/or elasticity of the flexible display.

Accordingly, considering the characteristics of the flexible display caused by the deformation thereof, development of a flexible display device that works accurately and stably is required.

SUMMARY

The present disclosure relates to a flexible display device characterized in that when two bodies slide (or move) relative to each other, friction occurring in a contact portion between the two bodies can be significantly reduced.

The present disclosure relates to a flexible display device in which a flexible display is deformed as the two bodies slide relative to each other, characterized in that when a user applies an external force to the flexible display device on both left and right sides of a movement direction of the two bodies while gripping the flexible display device, a pair of lubricating surfaces, which extend perpendicular to the direction of the external force, may face each other.

The present disclosure relates to a flexible display device in which the flexible display is deformed as the two bodies slide relative to each other, characterized in that a surface area of a lubricating surface of a means for facilitating the contact between the two bodies may be increased, and a size of the gap formed between the two bodies may be significantly reduced.

The present disclosure relates to a flexible display device in which the flexible display is deformed as the two bodies slide relative to each other, characterized in that the surface area of the lubricating surface of the means for facilitating the contact between the two bodies may be increased, and external exposure of the lubricating surface and a surface that comes into contact with the lubricating surface may be minimized.

The present disclosure relates to a flexible display device in which the flexible display is deformed as one body moves relative to the other body between a first position and a second position, characterized in that the shape of the flexible display device may be stably maintained when the one body is in the first position and the second position.

According to an aspect of the present disclosure, the flexible display device may be formed to be gripped and carried by a user. That is, the flexible display device may be formed to have approximately the same size, the same shape, and the same weight as those of general mobile terminals.

In some embodiments, the flexible display device may include a first body, a second body, and a flexible display.

The second body may be formed to move relative to the first body in a direction parallel to a first direction. The second body may move relative to the first body in the first direction. The second body may move relative to the first body in a direction opposite to the first direction.

The first body may be formed to move relative to the second body in a direction parallel to the first direction. The first body may move relative to the second body in the direction opposite to the first direction. The first body may move relative to the second body in the first direction.

The second body may reciprocate between a first position and a second position in the direction parallel to the first direction, relative to the first body. The first position may be a relative position of the second body with respect to the first body, and the second position may also be a relative position of the second body with respect to the first body.

When the second body is in the first position relative to the first body, it can be said that the flexible display device is in a first state, and when the second body is in the second position relative to the first body, it can be said that the flexible display device is in a second state. Accordingly, in the description of the present disclosure, "the first position" may be used in the same sense as "the first state of the flexible display device," and "the second position" may be used in the same sense as "the second state of the flexible display device."

The direction from the first position toward the second position is the first direction.

The second body may include a support.

The support may be formed along a second direction, which is a direction orthogonal to the first direction.

The support may be formed in the shape of a roller that is rotatable about a rotational axis extending in the second direction. That is, the support may be rotatably coupled to the second body.

The flexible display may include a first region and a second region.

The first region may be a region coupled to the first body. The first region may be fixedly coupled to the first body.

The first region may be fixed in front of the first body to face forward. The first region may form a front surface of the flexible display device. The first region may be formed as a plane surface. The first region may be parallel to the first direction and the second direction.

The second region may be a region of the flexible display that extends from the first region. A portion of the second region may be curved. A portion of the second region may be curved into a semicircular shape, and as the second body moves, the position of the curved portion in the second region may be changed.

A surface area of the second region that forms a single plane surface with the first region may change as the second body moves.

When the second body moves in the first direction relative to the first body, the surface area of the second region that forms a single plane surface with the first region may increase. When the second body moves in the direction opposite to the first direction relative to the first body, the surface area of the second region that forms a single plane surface with the first region may decrease.

The second region may be curved around the support.

A portion of the second region may be curved about a curvature center line, which coincides with the rotational axis of the support, to form a curved surface.

The second region may include a first connected region and a second connected region.

The first connected region may be a region that extends from the first region.

The second connected region may be a region that extends from the first connected region.

When the second body is in the first position, the first connected region may be curved around the support to form a curved surface, and the second connected region may be parallel to the first region. When the second body is in the first position, the first connected region may be curved around the support to form a curved surface. When the second body is in the first position, the first connected region may form a curved surface of a semicircular shape about the curvature center line.

When the second body is in the second position, the first connected region may form a single plane surface with the first region, and a portion of the second connected region may be curved around the support, forming a curved surface. When the second body is in the second position, a portion of the second connected region may be curved around the support to form a curved surface. When the second body is in the second position, a portion of the second connected region may form a curved surface of a semicircular shape about the curvature center line.

According to an aspect of the present disclosure, the flexible display device may include a lubrication rail.

The lubrication rail may be made of self-lubricating engineering plastic. The lubrication rail may be made of polyoxymethylene (POM).

The lubrication rail may be formed to extend in the first direction. That is, a longitudinal direction of the lubrication rail may be parallel to the first direction.

The lubrication rail may have a constant cross section along the first direction.

The lubrication rail may be formed so as to be fixed to any one of the first body or the second body and to contact the other one of the first body or the second body.

In an embodiment, the lubrication rail may be fixed to the first body and come into contact with the second body. Here, a state in which at least a portion of the lubrication rail continuously contacts the second body may be maintained when the second body is between the first position and the second position.

In another embodiment, the lubrication rail may be fixed to the second body and may contact the first body. Here, a state in which at least a portion of the lubrication rail continuously contacts the first body may be maintained when the second body is between the first position and the second position.

In the flexible display device, the lubrication rail may be provided as a pair of lubrication rails. Here, the pair of lubrication rails may include a first lubrication rail and a second lubrication rail.

The first lubrication rail may be fixed to any one of the first body or the second body and may continuously contact the other one of the first body or the second body in a first contact direction which is orthogonal to the first direction.

The second lubrication rail may be fixed to any one of the first body or the second body and may continuously contact the other one of the first body or the second body in a second contact direction which is orthogonal to the first direction.

The first lubrication rail and the second lubrication rail may be symmetrical to each other with respect to a reference surface that bisects the first body and the second body along the first direction.

The first contact direction and the second contact direction may be opposite directions to each other.

The first body may include a first side edge portion and a second side edge portion.

Each of the first side edge portion and the second side edge portion may be parallel to the first direction and may form an edge of the flexible display device when the second body is in the second position.

The second body may include a third side edge portion and a fourth side edge portion.

Each of the third side edge portion and the fourth side edge portion may be positioned further outside than the first side edge portion and the second side edge portion, and may form an edge of the flexible display device.

The first lubrication rail may be fixed to an inner side surface of the third side edge portion and may contact the first side edge portion.

The second lubrication rail may be fixed to an inner side surface of the fourth side edge portion and may contact the second side edge portion.

The first side edge portion may include a first outer side wall and a first inner side wall.

The first outer side wall may be formed along the first direction.

The first inner side wall may be formed along the first direction, and may be positioned further inside than the first outer side wall. The first inner side wall may be spaced apart from the first outer side wall by at least a portion.

The second side edge portion may include a second outer side wall and a second inner side wall.

The second outer side wall may be formed along the first direction.

The second inner side wall may be formed along the first direction, and may be positioned further inside than the second outer side wall. At least a portion of the second outer side wall may be spaced apart from the second inner side wall.

The first lubrication rail may include a first neck portion and a first contact portion.

The first neck portion may be fixed to the third side edge portion and may extend inward from the third side edge portion.

The first contact portion may be a portion that is bent from the first neck portion, and may be interposed between the first outer side wall and the first inner side wall.

The second lubrication rail may include a second neck portion and a second contact portion.

The second neck portion may be fixed to the fourth side edge portion and may extend inward from the fourth side edge portion.

The second contact portion may be a portion that is bent from the second neck portion, and may be interposed between the second outer side wall and the second inner side wall.

The first neck portion and the second neck portion may be formed to be parallel to the first region.

The first contact portion and the second contact portion may be formed to be orthogonal to the first region.

The first contact portion may be formed to come into contact with the first outer side wall and the first inner side wall.

The second contact portion may be formed to come into contact with the second outer side wall and the second inner side wall.

The inner side surface of the third side edge portion may come into contact with an outer side surface of the first outer side wall, and the inner side surface of the fourth side edge portion may come into contact with an outer side surface of the second outer side wall.

When viewed in a direction that is orthogonal to the first region, a size of each of the first lubrication rail and the second lubrication rail may be ⅕ to ½ of a size of the flexible display device.

In some embodiments, the first lubrication rail and the second lubrication rail may be formed such that a length of each of the first lubrication rail and the second lubrication rail in the first direction (X direction) is equal to or greater than 80% of a length of each of the third side edge portion and the fourth side edge portion.

The first body may include a first back cover which forms a rear surface of the first body.

The second body may include a second back cover which forms a rear surface of the second body.

The second back cover may be positioned behind the first back cover.

In some embodiments, the flexible display device may include an auxiliary roller.

The auxiliary roller may be coupled to the first back cover so as to be rotatable about a rotational axis that is parallel to the second direction which is orthogonal to the first direction, and may be configured such that an outer circumferential surface of the auxiliary roller comes into contact with an inner side surface of the second back cover.

In some embodiments, a first stopping groove and a second stopping groove, of a hemispherical shape, may be formed on the inner side surface of the second back cover, to be spaced apart from each other. The flexible display device may further include a stopper device fixed to the first body.

The stopper device may include a stopper and a spring.

The stopper may be inserted into the first stopping groove when the second body is in the first position, and may be inserted into the second stopping groove when the second body is in the second position.

The spring may be formed to press the stopper towards the inner side surface of the second back cover.

The first stopping groove, the second stopping groove, and the stopper device may respectively be provided as a pair of first stopping grooves, a pair of second stopping grooves, and a pair of stopper devices, to be symmetrical to each other with respect to the reference surface.

In some embodiments, the flexible display device may further include an auxiliary rail and a slider.

The auxiliary rail may be formed to be parallel to the first direction, and may be fixed to the first body.

The slider may be fixed to the second body and may engage the auxiliary rail so as to slide along the first direction.

The auxiliary rail may be positioned further inside than the first lubrication rail and the second lubrication rail.

In some embodiments, the flexible display device may include a plurality of support bars.

The plurality of support bars may be formed to extend in the second direction, which is orthogonal to the first direction, and may be fixed to an inner side surface of the second region.

Each of the plurality of the support bars may include a first support slider, a second support slider, and a connection arm.

The first support slider may form one end portion of a support bar.

The second support slider may form the other end portion of the support bar at the opposite side thereof to the first support slider.

The connection arm may connect the first support slider to the second support slider and may support the second region.

The second body may include a first movement guide groove and a second movement guide groove.

The first movement guide groove may be formed as a U-shaped groove, and may form a path into which the first support slider is inserted and through which the first support slider moves.

The second movement guide groove may be formed as a U-shaped groove to form a path into which the second support slider is inserted and through which the second support slider moves.

In embodiments of the present disclosure, the lubrication rail may be made of self-lubricating engineering plastic, may be fixed to the second body, and may come into contact with the first body when the flexible display device is deformed between the first state and the second state. The lubrication rail may be provided as a pair of lubrication rails, and the pair of lubrication rails may be symmetrical to each other with respect to the reference surface. Accordingly, when the second body moves relative to the first body, or when the first body moves relative to the second body, the lubrication rail may smoothly slide on the first body while contacting the first body, and thus, friction that occurs in a contact portion between the first body and the second body due to the relative movement of the two bodies may be significantly reduced.

In the embodiments, the first lubrication rail may be fixed to the inner side surface of the third side edge portion and may come into contact with the first side edge portion in the first contact direction, and the second lubrication rail may be fixed to the inner side surface of the fourth side edge portion and may come into contact with the second side edge portion in the second contact direction. The first contact direction and the second contact direction may be opposite directions to each other. Accordingly, when a user applies an external force to the third side edge portion and the fourth side edge portion while gripping the flexible display device on the third side edge portion and the fourth side edge portion, a surface of the first lubrication rail that comes into contact with the first side edge portion may, as a lubricating surface, apply a load to the first body, and a surface of the second lubrication rail that comes into contact with the second side edge portion may, as a lubricating surface, apply a load to the first body. Here, the lubricating surface of the first lubrication rail and the lubricating surface of the second lubrication rail may face each other. Accordingly, most of the load applied by the user to the flexible display device while the user is gripping the flexible display device may be applied to the first lubrication rail and the second lubrication rail, and the friction that occurs between the first body and the second body due to the relative movement thereof may be significantly reduced by the lubricating surface of the first lubrication rail and the lubricating surface of the second lubrication rail.

In the embodiments, the first side edge portion may include the first outer side wall and the first inner side wall, and the second side edge portion may include the second outer side wall and the second inner side wall. The first contact portion of the first lubrication rail may be bent from the first neck portion and interposed between the first outer side wall and the first inner side wall, and the second contact portion of the second lubrication rail may be bent from the second neck portion and interposed between the second outer side wall and the second inner side wall. Accordingly, a surface area of each of the lubricating surfaces of the first lubrication rail and the second lubrication rail, which facilitate the contact between the first body and the second body, may be sufficiently increased, and the first lubrication rail and the second lubrication rail may be prevented from being exposed to the outside.

In the embodiments, the first lubrication rail may come into contact with the first side edge portion while being inserted into the first side edge portion, and the second lubrication rail may come into contact with the second side edge portion while being inserted into the second side edge portion. Accordingly, the third side edge portion and the fourth side edge portion may be formed to have a relatively small thickness. In addition, the first outer side wall may come into contact with the third side edge portion, and the second outer side wall may come into contact with the fourth side edge portion. Accordingly, the size of a gap formed between the first side edge portion and the third side edge portion may be reduced, and the size of a gap formed between the second side edge portion and the fourth side edge portion may be reduced.

Here, the first lubrication rail may be formed such that a gap between the first outer side wall and the first inner side wall corresponds to a thickness of the first neck portion or a thickness of the first contact portion, and a gap between the second outer side wall and the second inner side wall corresponds to a thickness of the second neck portion or a thickness of the second contact portion, wherein the gaps may be formed to be relatively small.

In the embodiments, the first stopping groove and the second stopping groove may be formed in the second back cover of the second body, and the flexible display device may include the stopper device. The stopper of the stopper device may be inserted into the first stopping groove when the second body is in the first position, and may be inserted into the second stopping groove when the second body is in the second position. Accordingly, the first state and the second state of the flexible display device may be stably maintained, and in each state, the flexible display device may be stable.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 1 is a block diagram for explaining a flexible display device.

FIG. 2a is a front view of a flexible display in a first state, and FIG. 2b is a view illustrating the flexible display device of FIG. 2a in a second state in which the flexible display has been deformed.

FIG. 3a is a rear view of the flexible display device of FIG. 2a, and FIG. 3b is a rear view of the flexible display device of FIG. 2b.

FIG. 4 is an exploded perspective view of the flexible display device of FIG. 2a.

FIG. 5a is a perspective view of a flexible display separated from the flexible display device in the first state, and FIG. 5b is a perspective view of the flexible display of FIG. 5a when the flexible display has been deformed (i.e. when the flexible display device is in the second state).

FIG. 6a is a cross-sectional view of the flexible display device of FIG. 2a taken along the line A to A'. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

FIG. 8a is a cross-sectional view illustrating inner surfaces of a third side edge portion and a second edge portion, and FIG. 8b is a cross-sectional view illustrating inner surfaces a fourth side edge portion and the second edge portion.

FIG. 9 is a cross-sectional view schematically illustrating a state in which a support bar, an inner plate, and a flexible display are coupled.

FIG. 10a is a plane view schematically illustrating a first body, a second body, and lubrication rails decoupled from one another.

FIG. 10b is a cross-sectional view schematically illustrating the coupling relationship between the first body, the second body, and the lubrication rails according to one embodiment, and FIG. 10c is a cross-sectional view schematically illustrating the coupling relationship between the first body, the second body, and the lubrication rails according to another embodiment.

FIG. 11 is a cross-sectional view of the flexible display device taken along the line B-B' of FIG. 3b.

FIG. 12a and FIG. 12b are perspective views illustrating the flexible display device in the second state.

FIG. 13 illustrates the flexible display device in the second state, showing a relative length of each component.

FIG. 14a is a view illustrating a portion of a first back cover of the first body of the flexible display device.

FIG. 14b is a cross-sectional view illustrating a portion of the flexible display device in which an auxiliary roller is formed.

FIG. 15a is a rear view of the flexible display device in the first state, and FIG. 15b is a rear view of the flexible display device in the second state.

FIG. 16a is a view illustrating a cross section of a portion of the flexible display device in the first state, and FIG. 16b is a cross section of a portion of the flexible display device in the second state.

FIG. 17 is view schematically illustrating how an antenna is formed within a flexible display device according to an embodiment of the present disclosure.

DETAILED DESCRIPTION

Hereinafter, exemplary embodiments disclosed herein will be described in detail with reference to the accompanying drawings. The shapes, sizes, ratios, angles, the number of elements given in the drawings are merely exemplary, and thus, the present disclosure is not limited to the illustrated details. Like reference numerals designate like elements, and redundant description thereof will be omitted. Suffixes "module" and "unit" or "portion" or "part" for elements used in the following description are merely provided for facilitation of preparing this specification, and thus they are not granted a specific meaning or function. In the following description, when it is considered that known functions or structures may confuse the gist of the embodiments of the present disclosure, the known functions or structures are not explained. Further, the accompanying drawings are provided for easy understanding of the embodiment disclosed in the present specification, but the technical spirit of the present disclosure is not limited by the accompanying drawings. It should be understood that all changes, equivalents, and alternatives included in the spirit and the technical scope of the present disclosure are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the articles "a," "an," and "the," include plural referents unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of:" For example, the expression "at least one of A, B, and C" may also include an nth member, where n is greater than 3, whereas the expression "at least one selected from the group consisting of A, B, and C" does not.

A flexible display device described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (MILAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the other mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor which senses the presence of an object that is approaching a predetermined sensing surface or of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source to transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

Meanwhile, the flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

FIG. 2*a* is a perspective view of the flexible display device 1 in a first state, and FIG. 2*b* is a perspective view of the flexible display device 1 of FIG. 2*a* in a second state in which the flexible display has been deformed.

FIG. 3*a* is a rear view of the flexible display device 1 of FIG. 2*a*, and FIG. 3*b* is a rear view of the flexible display device 1 of FIG. 2*b*.

FIG. 4 is an exploded perspective view of the flexible display device 1 of FIG. 2*a*.

In one embodiment, the flexible display device 1 may include a body 200, a plurality of support bars 370, and a support 400. The body 200 may include a first body 200*a* and a second body 200*b*.

In describing embodiments of the present disclosure, a first direction (X direction), a second direction (Y direction), and a third direction (Z direction) shown in the drawings are directions perpendicular to one another.

The flexible display device 1 may include two surfaces 1*a* and 1*b* which are opposite to each other. In other words, the flexible display device 1 may include a first surface 1*a* and a second surface 1*b*. A direction the first surface 1*a* faces (i.e. a direction perpendicular to or substantially perpendicular to the first surface 1*a*) may be opposite to a direction the second surface 1*b* faces (i.e. a direction perpendicular to or substantially perpendicular to the second surface 1*b*). In the flexible display device 1, the first surface 1*a* may face the third direction (Z direction), and the second surface 1*b* may face a direction opposite to the third direction (Z direction). When the first surface 1*a* is a front surface of the flexible display device 1, the second surface 1*b* may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material. For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (third direction), the body 200 may have a quadrangular shape as a whole, and may be flat as a whole.

The body 200 may be divided into two or more parts. As described in detail above, the body 200 may include the first body 200*a* and the second body 200*b*, and the first body 200*a* and the second body 200*b* may be formed to move relative to each other (see FIGS. 2*a*, 2*b*, 3*a*, and 3*b*).

The second body 200*b* may slide and reciprocate relative to the first body 200*a*. Accordingly, when viewed from the front, the total area occupied by the body 200 may change as the second body 200*b* moves.

The second body 200*b* may reciprocate relative to the first body 200*a* between a first position and a second position.

When viewed from the front or rear, the total area occupied by the body 200 (the area of the body 200 projected in the Z direction) may be the smallest when the second body 200*b* is in the first position (see FIGS. 2*a* and 3*a*), and the total area occupied by the body 200 (the area of the body 200 projected in the Z direction) may be the largest when the second body 200b is in the second position (see FIGS. 2b and 3b).

When viewed from the front or rear, the overlapping area between the first body 200a and the second body 200b may be the largest when the second body 200b is in the first position (see FIGS. 2a and 3a), and the overlapping area between the first body 200a and the second body 200b may be the smallest when the second body 200b is in the second position (see FIGS. 2b and 3b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

FIG. 5a is a perspective view of a flexible display separated from the flexible display device in the first state, and FIG. 5b is a perspective view of the flexible display of FIG. 5a when the flexible display has been deformed (i.e. when the flexible display device is in the second state).

FIG. 6a is a cross-sectional view taken along line A-A' of FIG. 2a. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

The support 400 may be coupled to the second body 200b. The support 400 may be fixedly coupled to the second body 200b, and may be fixed to the second body 200b such that the support 400 rotates about a central axis 401.

The support 400 is formed along the second direction (Y direction). The support 400 may be formed to extend in the second direction (Y direction), and may have a constant cross section along the second direction.

In the flexible display device 1, the support 400 may be formed to support a portion of an inner surface of the flexible display 300. That is, a portion of the flexible display 300 may be curved around the support 400, and a direction of formation of the flexible display 300 may be changed along the circumferential direction of the support 400.

The support 400 may be formed to rotate in both directions about the central axis 401 which is parallel to the second direction. That is, the support 400 may be coupled to the second body 200b so as to rotate about the central axis 401.

The support 400 may be formed in the shape of a roller.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected. The flexible display 300 may include a fourth region 340.

If the flexible display 300 is not coupled to the body 200 and is spread flat, the fourth region 340, the first region 310, the second region 320, and the third region 330 may form a single plane.

Broken lines shown in FIG. 2b are imaginary lines respectively representing a boundary between the first region 310 and (a first connected region 321 of) the second region 320, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The first region 310 may be parallel to the first and second directions. The first region 310 may be fixed in front of the first body 200a. The first region 310 may be fixed in front of the first body 200a based on the third direction. The first region 310 and the first body 200a may be coupled to each other so as to be parallel to each other.

In an embodiment of the present disclosure, the first region 310 may form a curved surface as a whole. Here, a curvature of the first region 310 may be smaller than a curvature of the first connected region 321, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The fourth region 340 may extend from the first region 310 and form an end portion of the flexible display 300. The fourth region 340 may have a constant cross section along the second direction, and may form a curved surface. In an embodiment, the fourth region 340 may form a dummy portion on which an image is not displayed, and in another embodiment, the fourth region 340 may be configured to display an image thereon.

The second region 320 may extend from the first region 310, and a portion of the second region 320 may be curved around support 400. That is, a direction of formation of the second region 320 may be changed as the second region 320 passes around the support 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and the second connected region 322.

The first connected region 321 may be directly connected to the first region 310, and the second connected region 322 may be directly connected to the first connected region 321 and the third region 330.

When the second body 200b is in the first position, the first connected region 321 may form a curved surface along the circumferential direction of the support 400.

When the second body 200b is in the first position, the first connected region 321 may form an outer surface of the flexible display 300 that is curved about a curvature center line CL1. When the second body 200b is in the first position, the curvature center line CL1 may be an imaginary straight line that forms a center of curvature of the first connected region 321, and may be parallel to the second direction.

When the second body 200b is in the first position, a cross section of the first connected region 321 may form a semicircular shape.

The curvature center line CL1 may coincide with the central axis 401 of support 400.

When the second body 200b is in the second position, the curvature center line CL1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face a direction opposite to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

The third region 330, on the opposite side to the first region 310, may extend from the second region 320. The third region 330 may be formed to extend from the second connected region 322 and may form an end portion of the flexible display 300.

In the flexible display 300, the first region 310, the second region 320, and the fourth region 340 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300. Alternatively, the third region 330 may be formed integrally with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a front surface of the body 200. The camera 121 may be fixed to a front surface of the first body 200a.

The camera 121 may be fixed to a rear surface of the body 200. The camera 121 may be coupled to the body 200 so as to face the direction opposite to the third direction (Z direction).

The camera 121 may be fixed to a rear surface of the first body 200a.

The camera 121 may be fixed to the body 200 at a portion away from the support 400. That is, if the support 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the support 400.

The camera 121 may be two or more cameras 121 arranged in the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and a cross section of the first edge portion 205 may have, for example, a semicircular shape.

The fourth region 340 may be fixed to the first edge portion 205.

The first body 200a may include a first side edge portion 210 and a second side edge portion 220. The first side edge portion 210 and the second side edge portion 220 may form edges on both sides of the first body 200a, and may extend in the first direction. The first side edge portion 210 may be formed over the entire section of any one edge of the first body 200a, or may be formed over a partial section thereof. The second side edge portion 220 may be formed over the entire section of any one edge of the first body 200a, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200a, the second side edge portion 220 may form a right side edge of the first body 200a.

The second body 200b may include a second edge portion 206.

The second edge portion 206 may form an edge of the flexible display device 1 on the opposite side of the flexible display device 1 to the first edge portion 205. If the first edge portion 205 forms an upper side edge of the flexible display device 1, the second edge portion 206 may form a lower side edge of the flexible display device 1.

The second edge portion 206 may be disposed at an outer side of the support 400.

Between the second edge portion 206 and the support 400, a gap 207, which is relatively narrow, may be provided, and through the gap 207, the flexible display 300 may move, forming a curved surface (see FIGS. 6a and 6b).

In addition, a connection arm 373 of the support bar 370 may move through the gap 207.

The second edge portion 206 may be fixed to the second body 200b. The second edge portion 206 may be integrally formed with the second body 200b, or may be formed separately from the second body 200b and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200b may include a third side edge portion 250 and a fourth side edge portion 260. The third side edge portion 250 and the fourth side edge portion 260 may form edges on both sides of the second body 200b, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200b, the fourth side edge portion 260 may form a right side edge of the second body 200b.

The third side edge portion 250 may be disposed to align with the first side edge portion 210, and may be disposed so as to come into close contact with the first side edge portion 210 or to be close thereto.

The third side edge portion 250 may be disposed further outside than the first side edge portion 210 or further inside than the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed further outside than the second side edge portion 220 or further inside than the second side edge portion 220.

The flexible display device may include a first back cover 270 and a second back cover 280.

The first back cover 270 may be formed in the shape of a plate that is substantially parallel to the first direction (X direction) and the second direction (Y direction). The first back cover 270 may be parallel to or substantially parallel to the first region 310.

The first back cover 270 may form a back surface of the first body 200a. The first back cover 270 may be fixed to the first body 200a or may be detachably coupled to the first body 200a.

The first back cover 270 may be formed to be transparent or opaque.

The first back cover 270 may be formed such that a surface area thereof corresponds to a surface area of the first region 310, or is equal to or greater than the surface area of the first region 310.

The second back cover 280 may be formed in the shape of a plate that is substantially parallel to the first direction (X direction) and the second direction (Y direction). The second back cover 280 may be parallel to or substantially parallel to the first region 310.

The second back cover 280 may form a back surface of the second body 200b. The second back cover 280 may be fixed to the second body 200b or may be detachably coupled to the second body 200b.

The second back cover 280 may be formed to be transparent or opaque.

When the second body 200b is in the first position, a surface area of the second back cover 280 may correspond to a surface area of the second connected region 322, or may be equal to or greater than the surface area of the second connected region 322.

When the second back cover 280 is formed to be transparent, an image displayed on the second connected region 322 while the second body 200b is in the first position may be seen through the second back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm According to an embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300. The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

FIG. 8a is a cross-sectional view illustrating inner surfaces of the third side edge portion 250 and the second edge portion 206, and FIG. 8b is a cross-sectional view illustrating inner surfaces of the fourth side edge portion 260 and the second edge portion 206.

FIG. 9 is a cross-sectional view schematically illustrating a state in which the support bar 370, the inner plate 350, and the flexible display 300 are coupled.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semi-circular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side of the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the plurality of support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the plurality of support bars 370 in the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the plurality of support bars 370, are maintained stable like the first region 310.

A front surface of the connection arm 373 and a front surface of the support plate 230 may form a single plane.

The second region 320 may be maintained in a stable state by means of the plurality of support bars 370. In particular, when the second region 320 is formed as a touch screen to receive a touch input, the second region 320 may be stably supported by the plurality of support bars 370.

FIG. 10a is a plane view schematically illustrating the first body 200a, the second body 200b, and lubrication rails 510 and 520 decoupled from one another.

FIG. 10b is a cross-sectional view schematically illustrating the coupling relationship between the first body 200a, the second body 200b, and the lubrication rails 510 and 520 according to one embodiment, and FIG. 10c is a cross-sectional view schematically illustrating the coupling relationship between the first body 200a, the second body 200b, and the lubrication rails 510 and 520 according to another embodiment.

FIG. 11a is a cross-sectional view of the flexible display device taken along the line B-B' of FIG. 3b.

FIG. 12a and FIG. 12b are perspective views illustrating the flexible display device 1 in the second state.

FIG. 13 illustrates the flexible display device 1 in the second state, showing a relative length of each component.

The flexible display device 1 may include lubrication rails 510 and 520.

A self-lubricative material is a material that has relatively low frictional resistance even without a lubricant being added thereto. Some materials that are categorized as engineering plastic are self-lubricative materials.

The lubrication rails 510 and 520 of an embodiment of the present disclosure may include such a self-lubricating engineering plastic. The lubrication rails 510 and 520 may include any one or more from MC nylon, POM (polyacetal or polyoxymethylene), Ultra High Molecular Weight Polyethylene (UHMWPE), HDPE (high density polyethylene), or Polytetrafluoroethylene (PTFE, Teflon).

In an embodiment of the present disclosure, the lubrication rails 510 and 520 may be made of a material having a surface friction coefficient no greater than 0.2.

In an embodiment, the lubrication rails 510 and 520 may be made of POM.

The lubrication rails 510 and 520, having a self-lubricating property, may have a surface friction coefficient that is significantly smaller than a surface friction coefficient of a general metal, plastic, etc. For example, POM has a surface friction coefficient of approximately 0.18, UHMWPE has a surface friction coefficient of approximately 0.11 to 0.07, HDPE has a surface friction coefficient of approximately 0.18 to 0.08, and PTFE has a surface friction coefficient of approximately 0.1 to 0.04.

The lubrication rails 510 and 520 may move relative to another component of the flexible display device 1 while surfaces of the lubrication rails 510 and 520 are contacting the another component. Here, a lubricating action may occur on the surfaces of the lubrication rails 510 and 520. Accordingly, in an embodiment of the present disclosure, a surface of the lubrication rails 510 and 520 that moves relative to the another component of the flexible display device 1 while contacting the another component will be referred to as a "lubricating surface."

The lubrication rails 510 and 520 may be formed to extend along the first direction (X direction). That is, longitudinal directions of the lubrication rails 510 and 520 may be parallel to the first direction (X direction).

The entirety or a portion of the lubrication rails 510 and 520 may have a constant cross section along the first direction (X direction).

The lubrication rails 510 and 520 may be fixed to any one of the first body 200a or the second body 200b, and may continuously come into contact with the other one of the first body 200a or the second body 200b. For this, the lubrication rails 510 and 520 may be formed such that lengths d11 and d12 of the lubrication rails 510 and 520 in the first direction (X direction) are greater than a movement range (or stroke; d2) of the second body 200b relative to the first body 200a. That is, the lubrication rails 510 and 520 may be formed such that the lengths d11 and d12 of the lubrication rails 510 and 520 in the first direction (X direction) are greater than the movement distance d2 of the second body 200b from the first position to the second position (or from the second position to the first position).

In an embodiment, the lubrication rails 510 and 520 may be formed such that surfaces 510a and 520a of the lubrication rails 510 and 520 at one side thereof are fixed to the first body 200a, and surfaces 510b and 520b of the lubrication rails 510 and 520 at the opposite side of the surfaces 510a and 520a come into contact with the second body 200b. Here, a state in which at least a portion of the surfaces 510b and 520b of the lubrication rails 510 and 520 continuously contact the second body 200b may be maintained. Self-lubricating action may occur on surfaces of the lubrication rails 510 and 520 that slide on the second body 200b while contacting the second body 200b. That is, self-lubricating action may occur on the surfaces 510b and 520b (or lubricating surfaces 510b and 520b) of the lubrication rails 510 and 520.

In another embodiment, the lubrication rails 510 and 520 may be formed such that the surfaces 510a and 520a of the lubrication rails 510 and 520 at one side thereof are fixed to the second body 200b, and the surfaces 510b and 520b of the lubrication rails 510 and 520 at the opposite side of the surfaces 510a and 520a come into contact with the first body 200a. Here, a state in which at least a portion of the surfaces 510b and 520b of the lubrication rails 510 and 520 continuously contact the first body 200a may be maintained. Self-lubricating action may occur on surfaces of the lubrication rails 510 and 520 that slide on the first body 200a while contacting the first body 200a. That is, self-lubricating action may occur on the surfaces 510b and 520b (or lubricating surfaces 510b and 520b) of the lubrication rails 510 and 520.

When the lubrication rails 510 and 520 are fixed to the first body 200a or the second body 200b, the lubrication rails 510 and 520 may be fixed thereto through various methods including, for example, a bonding method, a bolting method, a riveting method, a forcible insertion, etc.

The flexible display device 1 may be provided with a pair of lubrication rails 510 and 520. Here, the pair of lubrication rails 510 and 520 may include a first lubrication rail 510 and a second lubrication rail 520.

The first lubrication rail 510 may be fixed to any one of the first body 200a or the second body 200b and may continuously contact the other one of the first body 200a or the second body 200b in a first contact direction which is orthogonal to the first direction (X direction).

The second lubrication rail 520 may be fixed to any one of the first body 200a or the second body 200b and may continuously contact the other one of the first body 200a or the second body 200b in a second contact direction which is orthogonal to the first direction (X direction).

The first lubrication rail 510 and the second lubrication rail 520 may be symmetrical to each other about a reference surface CS. The reference surface CS described in the embodiments of the present disclosure is an imaginary surface that bisects the first body 200a and the second body 200b along a line parallel to the first direction (X direction). Further, the reference surface CS may be formed to be parallel to the first direction (X direction) and the third direction (Z direction), and may be an imaginary surface that bisects the first body 200a and the second body 200b.

In an embodiment, the first lubrication rail 510 and the second lubrication rail 520 may be fixed to the first body 200a, and may contact the second body 200b. That is, the first lubrication rail 510 and the second lubrication rail 520 may move together with the first body 200a, and may move relative to the second body 200b while contacting the second body 200b.

In another embodiment, the first lubrication rail 510 and the second lubrication rail 520 may be fixed to the second body 200b, and may contact the first body 200a. That is, the first lubrication rail 510 and the second lubrication rail 520 may move together with the second body 200b, and may move relative to the first body 200a while contacting the first body 200a.

The first lubrication rail 510 fixed to the second body 200b may contact the first body 200a in the first contact direction (CD11 and/or CD12). In addition, the second lubrication rail 520 fixed to the second body 200b may contact the first body 200a in the second contact direction (CD21 and/or CD22).

In the flexible display device 1 according to an embodiment of the present disclosure, the first contact direction (CD11 and/or CD12) and the second contact direction (CD21 and/or CD22) may be opposite directions to each other.

The first contact direction may be any one direction or a plurality of directions. The second contact direction may be any one direction or a plurality of directions.

When the first contact direction is a plurality of directions, the first contact direction may include a 1-1 contact direction (CD11) and a 1-2 contact direction (CD 12), and when the second contact direction is a plurality of directions, the second contact direction may include a 2-1 contact direction (CD21) and a 2-2 contact direction (CD 22).

As described in detail above, the first body 200a may include a first side edge portion 210 and a second side edge portion 220, and the second body 200b may include a third side edge portion 250 and a fourth side edge portion 260.

The first side edge portion 210 and the second side edge portion 220 may be symmetrical to each other about the reference surface CS, and the third side edge portion 250 and the fourth side edge portion 260 may be symmetrical to each other about the reference surface CS.

A length d31 of the first side edge portion 210 and a length d32 of the second side edge portion 220 in the first direction (X direction) may be greater than the movement range (or stroke; d2) of the second body 200b relative to the first body 200a. That is, each of the lengths d31 and d32 of the first side edge portion 210 and the second side edge portion 220 may be greater than the movement distance d2 of the second body 200b from the first position to the second position (or from the second position to the first position).

Also, a length d41 of the third side edge portion 250 and a length d42 of the fourth side edge portion 260 in the first direction (X direction) may be greater than the movement range (or stroke; d2) of the second body 200b relative to the first body 200a. That is, each of the lengths d41 and d42 of the third side edge portion 250 and the fourth side edge portion 260 may be greater than the movement distance d2 of the second body 200b from the first position to the second position (or from the second position to the first position).

Each of the lengths d41 and d42 of the third side edge portion 250 and the fourth side edge portion 260 in the first direction (X direction) may be greater than each of the lengths d11 and d12 of the lubrication rails 510 and 520.

In an embodiment, the length d11 of the first lubrication rail 510 and the length d12 of the second lubrication rail 520 in the first direction (X direction) may be equal to or greater than 80 percent of each of the lengths d41 and d42 of the third side edge portion 250 and the fourth side edge portion 260.

Each of the lengths d41 and d42 of the third side edge portion 250 and the fourth side edge portion 260 in the first direction (X direction) may be greater than each of the lengths d31 and d32 of the first side edge portion 210 and the second side edge portion 220.

In an embodiment, the first side edge portion 210 and the second side edge portion 220 may form edges of the first body 200a on both left and right sides thereof in a section of the first direction (X direction). Also, the third side edge portion 250 and the fourth side edge portion 260 may form edges of the second body 200b on both left and right sides thereof in a section of the first direction (X direction).

The third side edge portion 250 and the fourth side edge portion 260 may be disposed further outside than the first side edge portion 210 and the second side edge portion 220, and may form edges of the flexible display device 1.

When the second body 200b is in the first position, the first side edge portion 210 and the second side edge portion 220 may be positioned between the third side edge portion 250 and the fourth side edge portion 260. Here, an outer side surface of the first side edge portion 210 may come into contact with an inner side surface of the third side edge portion 250, and an outer side surface of the second side edge portion 220 may come into contact with an inner side surface of the fourth side edge portion 260.

When the second body 200b is in the first position, the first side edge portion 210 may be covered by the third side edge portion 250, and the second side edge portion 220 may be covered by the fourth side edge portion 260. When viewed in a direction that is orthogonal to the first direction (X direction), the first side edge portion 210 and the third side edge portion 250 may overlap the most when the second body 200b is in the first position, and the second side edge portion 220 and the fourth side edge portion 260 may overlap the most when the second body 200b is in the first position.

When the second body 200b is in the second position, the first side edge portion 210 and the second side edge portion 220 may still be positioned between the third side edge portion 250 and the fourth side edge portion 260. Also, when the second body 200b is in the second position, the outer side surface of the first side edge portion 210 may come into contact with the inner side surface of the third side edge portion 250, and the outer side surface of the second side edge portion 220 may come into contact with the inner side surface of the fourth side edge portion 260.

When the second body 200b is in the second position, a relatively large portion of the first side edge portion 210 may be exposed to the outside, and a relatively large portion of the second side edge portion 220 may be exposed to the outside. When viewed in the direction that is orthogonal to the first direction (X direction), the first side edge portion 210 and the third side edge portion 250 may overlap the least when the second body 200b is in the second position, and the second side edge portion 220 and the fourth side edge portion 260 may overlap the least when the second body 200b is in the second position.

The first lubrication rail 510 may be fixed to the inner side surface of the third side edge portion 250 and may come into contact with the first side edge portion 210. The second lubrication rail 520 may be fixed to the inner side surface of the fourth side edge portion 260 and may come into contact with the second side edge portion 220.

A rear end of the first lubrication rail 510 (i.e., an end thereof that is relatively closer to the first edge portion 205) may not protrude from a rear end of the third side edge portion 250 along the first direction (X direction), and a front end of first lubrication rail 510 (i.e., the other end thereof that is relatively closer to the second edge portion 206) may not protrude from a front end of the third side edge portion 250 along the first direction (X direction).

A rear end of the second lubrication rail 520 (i.e., an end thereof that is relatively closer to the first edge portion 205) may not protrude from a rear end of the fourth side edge portion 260 along the first direction (X direction), and a front end of second lubrication rail 520 (i.e., the other end thereof that is relatively closer to the second edge portion 206) may not protrude from a front end of the fourth side edge portion 260 along the first direction (X direction).

Accordingly, when the flexible display device 1 is in the first state and the second state, the first lubrication rail 510 and the second lubrication rail 520 may not be exposed to the outside.

When the flexible display device 1 is deformed to the first state or the second state, the first lubrication rail 510 may slide on the first side edge portion 210 while contacting the first side edge portion 210, and the second lubrication rail 520 may slide on the second side edge portion 220 while contacting the second side edge portion 220. The first lubrication rail 510 and the second lubrication rail 520 may be made of a material with a relatively excellent lubricating property, and a surface of the first lubrication rail 510 that comes into contact with the first side edge portion 210 and a surface of the second lubrication rail 520 that comes into contact with the second side edge portion 220 may serve as lubricating surfaces.

The first side edge portion 210 may include a first outer side wall 211 and a first inner side wall 212.

The first outer side wall 211 may be formed along the first direction (X direction).

The first inner side wall 212 may be formed along the first direction (X direction), and may be positioned further inside than the first outer side wall 211. At least a portion of the first inner side wall 212 may be spaced apart from the first outer side wall 211.

A length of the first outer side wall 211 and a length of the first inner side wall 212 in the first direction (X direction) may be greater than the movement range (or stroke) of the second body 200b relative to the first body 200a. That is, the length of each of the first outer side wall 211 and the first inner side wall 212 may be greater than the movement distance of the second body 200b from the first position to the second position (or from the second position to the first position).

The first outer side wall 211 and the first inner side wall 212 may be formed over the entire section of the first side edge portion 210 along the first direction (X direction), or may be formed over a substantial section of the first side edge portion 210.

Each of the first outer side wall 211 and the first inner side wall 212 may have a constant cross section along the first direction (X direction).

The second side edge portion 220 may include a second outer side wall 221 and a second inner side wall 222.

The second outer side wall 221 may be formed along the first direction (X direction).

The second inner side wall 222 may be formed along the first direction (X direction), and may be positioned further inside than the second outer side wall 221. At least a portion of the second inner side wall 222 may be spaced apart from the second outer side wall 221.

A length of the second outer side wall 221 and a length of the second inner side wall 222 in the first direction (X direction) may be greater than the movement range (or stroke) of the second body 200b relative to the first body 200a. That is, the length of each of the second outer side wall 221 and the second inner side wall 222 may be greater than the movement distance of the second body 200b from the first position to the second position (or from the second position to the first position).

The second outer side wall 221 and the second inner side wall 222 may be formed over the entire section of the second side edge portion 220 along the first direction (X direction), or may be formed over a substantial section of the second side edge portion 220.

Each of the second outer side wall 221 and the second inner side wall 222 may have a constant cross section along the first direction (X direction).

The first lubrication rail 510 may include a first neck portion 511 and a first contact portion 512.

The first neck portion 511 and the first contact portion 512 may form the entire section of the first lubrication rail 510 along the first direction (X direction).

The first neck portion 511 may be fixed to the inner side surface of the third side edge portion 250 and may extend in an inward direction. The first neck portion 511 may come into contact with the first side edge portion 210.

The first contact portion 512 may be a portion that is bent from an inner end portion of the first neck portion 511. The first contact portion 512 may be interposed between the first outer side wall 211 and the first inner side wall 212 of the first side edge portion 210. The first contact portion 512 may come into contact with the first side edge portion 210.

The first lubrication rail 510, including the first neck portion 511 and the first contact portion 512, may generally have an L-shaped cross section.

The second lubrication rail 520 may include a second neck portion 521 and a second contact portion 522.

The second neck portion 521 and the second contact portion 522 may form the entire section of the second lubrication rail 520 along the first direction (X direction).

The second neck portion 521 may be fixed to the inner side surface of the fourth side edge portion 260 and may extend in an inward direction. The second neck portion 521 may come into contact with the second side edge portion 220.

The second contact portion 522 may be a portion that is bent from an inner end portion of the second neck portion 521. The second contact portion 522 may be interposed between the second outer side wall 221 and the second inner side wall 222 of the second side edge portion 220. The second contact portion 522 may come into contact with the second side edge portion 220.

The second lubrication rail 520, including the second neck portion 521 and the second contact portion 522, may generally have an L-shaped cross section.

The first neck portion 511 and the second neck portion 521 may be formed such that formation directions and surfaces thereof are parallel to the first region 310.

The first contact portion 512 and the second contact portion 522 may be formed such that formation directions and surfaces thereof are orthogonal to the first region 310.

The first contact portion 512 may be formed to contact the first outer side wall 211 and the first inner side wall 212. That is, an outer side surface of the first contact portion 512 may come into contact with an inner side surface of the first outer side wall 211, and an inner side surface of the first contact portion 512 may come into contact with an outer side surface of the first inner side wall 212.

The second contact portion 522 may be formed to contact the second outer side wall 221 and the second inner side wall 222. That is, an outer side surface of the second contact portion 522 may come into contact with an inner side surface of the second outer side wall 221, and an inner side surface of the second contact portion 522 may come into contact with an outer side surface of the second inner side wall 222.

A size of each of the first lubrication rail 510 and the second lubrication rail 520 along a direction that is orthogonal to the first region 310 (i.e., along the third direction (Z direction)) may be ⅕ to ½ of a size of the flexible display device 1 along the third direction (Z direction). That is, each of the first lubrication rail 510 and the second lubrication rail 520 may have any size (i.e., width) that is greater than one-fifth of a size between a front surface and a rear surface of the flexible display device 1 (i.e., a width of the flexible display device 1) and smaller than half of the width of the flexible display device 1.

Accordingly, the first side edge portion 210 and the third side edge portion 250 may be adjacent to or come into contact with each other, and the second side edge portion 220 and the fourth side edge portion 260 may be adjacent to or come into contact with each other. Also, the second body 200b may stably move relative to the first body 200a in the first direction (X direction) or in the direction opposite to the first direction (X direction). Accordingly, an unintended gap may be prevented from being formed between the first body 200a and the second body 200b, or unintended tilting thereof may be prevented.

Since the first lubrication rail 510 includes the first neck portion 511 and the first contact portion 512, and the second lubrication rail 520 includes the second neck portion 521 and the second contact portion 522, the size of the lubricating surfaces of the first lubrication rail 510 and the second lubrication rail 520 may be sufficiently increased.

In addition, the first lubrication rail 510 may be inserted between the first outer side wall 211 and the first inner side wall 212 to contact the first side edge portion, and the second lubrication rail 520 may be inserted between the second outer side wall 221 and the second inner side wall 222 to contact the second side edge portion 220. Accordingly, the third side edge portion 250 and the fourth side edge portion 260 may be formed to have a relatively small thickness, the first outer side wall 211 may come into contact with the third side edge portion 250, and the second outer side wall 221 may come into contact with the fourth side edge portion 260. Accordingly, a size of a gap formed between the first side edge portion 210 and the third side edge portion may be minimized, and a size of a gap formed between the second side edge portion 220 and the fourth side edge portion 260 may be minimized.

In addition, the first side edge portion 210 may be formed such that a gap 213 between the first outer side wall 211 and the first inner side wall 212 corresponds to a thickness of the first neck portion 511 or a thickness of the first contact portion 512, and a gap 223 between the second outer side wall 221 and the second inner side wall 222 corresponds to a thickness of the second neck portion 521 or a thickness of the second contact portion 522. Also, the gaps 213 and 223 may be formed to be relatively small.

Hereinafter, lubricating action of the first lubrication rail 510 and the second lubrication rail 520 will be described.

When the flexible display device 1 is deformed between the first state and the second state, the user may move the second body 200b relative to the first body 200a while gripping the first body 200a, or the user may move the first body 200a relative to the second body 200b while gripping the second body 200b.

As illustrated in FIG. 2b, when the flexible display device 1 has a structure in which the third side edge portion 250 is formed at an outer side of the first side edge portion 210, and the fourth side edge portion 260 is formed at an outer side of the second side edge portion 220, the user may move the first body 200a relative to the second body 200b while gripping the second body 200b with a hand H of the user.

When the user grips the second body 200b on both left and right side edge portions thereof with the hand H, an external force (hereinafter referred to as a "first external force F1") may be applied to the third side edge portion 250, and an external force (hereinafter referred to as a "second external force F2") may be applied to the fourth side edge portion 260. Here, the first external force F1 and the second external force F2 may generally act in directions that face each other (i.e., in the opposite directions to each other).

The third side edge portion 250 and the fourth side edge portion 260 may be slightly deformed (i.e., moved) in directions facing each other (i.e., in an inward direction of the flexible display device 1) by the first external force F1 and the second external force F2.

Accordingly, the first external force F1 may be transferred into the flexible display device 1 through the third side edge portion 250, and the second external force F2 may be transferred into the flexible display device 1 through the fourth side edge portion 260.

The first external force F1 may be transferred to the first lubrication rail 510 fixed to the third side edge portion 250, and the first lubrication rail 510 may press the first side edge portion 210. In particular, the inner side surface of the first contact portion 512 of the first lubrication rail 510 may be a first inner lubricating surface 513 and may press the first inner side wall 212 in the 1-1 contact direction (CD11) among the first contact directions. Here, a substantial amount of the first external force F1 may be transferred to a portion in which the inner side surface of the first contact portion 512 (i.e., the first inner lubricating surface 513) and the outer side surface of the first inner side wall 212 come into contact with each other.

Also, the second external force F2 may be transferred to the second lubrication rail 520 fixed to the fourth side edge portion 260, and the second lubrication rail 520 may press the second side edge portion 220. In particular, the inner side surface of the second contact portion 522 of the second lubrication rail 520 may be a second inner lubricating surface 523 and may press the second inner side wall 222 in the 2-1 contact direction (CD21) among the second contact directions. Here, a substantial amount of the second external force F2 may be transferred to a portion in which the inner side surface of the second contact portion 522 (i.e., the second inner lubricating surface 523) and the outer side surface of the second inner side wall 222 come into contact with each other.

Here, the 1-1 contact direction (CD11) may be the second direction (Y direction), and the 2-1 contact direction (CD21) may be a direction opposite to the second direction (Y direction).

As described above, a substantial amount of the first external force F1 may be transferred to the lubricating surface of the first lubrication rail 510 (i.e., to the first inner lubricating surface 513), and a substantial amount of the second external force F2 may be transferred to the lubricating surface of the second lubrication rail 510 (i.e., to the second inner lubricating surface 523). Accordingly, friction that occurs within the flexible display device 1 when the user moves the first body 200a relative to the second body 200b while gripping the second body 200b may be significantly reduced.

Meanwhile, the third side edge portion 250 may come into close contact with the first outer side wall 211, and the fourth side edge portion 260 may come into close contact with the second outer side wall 221.

Here, a part of the first external force F1 may be transferred to the first outer side wall 211, and the first outer side wall 211 may press the first contact portion 512 of the first lubrication rail 510. Also, another part of the first external force F1 may be transferred to the first lubrication rail 510, and the first lubrication rail 510 may press the first inner side wall 212. That is, the outer side surface of the first contact portion 512 may be a first outer lubricating surface 514 and may come into contact with the inner side surface of the first outer side wall 211 in the 1-2 contact direction (CD12), and the inner side surface of the first contact portion 512, as the first inner lubricating surface 513, may come into contact with the outer side surface of the first inner side wall 212 in the 1-1 contact direction (CD11).

In addition, a part of the second external force F2 may be transferred to the second outer side wall 221, and the second outer side wall 211 may press the second contact portion 522 of the second lubrication rail 520. Also, another part of the second external force F2 may be transferred to the second lubrication rail 520, and the second lubrication rail 520 may press the second inner side wall 222. That is, the outer side surface of the second contact portion 522 may be a second outer lubricating surface 524 and may come into contact with the inner side surface of the second outer side wall 221 in the 2-2 contact direction (CD22), and the inner side surface of the second contact portion 522, as the second inner lubricating surface 523, may come into contact with the outer side surface of the second inner side wall 222 in the 2-1 contact direction (CD21).

Here, the 1-1 contact direction (CD11) among the first contact directions may be the second direction (Y direction), and the 2-1 contact direction (CD21) among the second contact directions may be the direction opposite to the second direction (Y direction). That is, the 1-1 contact direction (CD11) and the 2-1 contact direction (CD21) may be opposite directions to each other. Here, the 1-2 contact direction (CD12) among the first contact directions may be the direction opposite to the second direction (Y direction), and the 2-2 contact direction (CD22) among the second contact directions may be the second direction (Y direction). That is, the 1-2 contact direction (CD12) and the 2-2 contact direction (CD22) may be opposite directions to each other.

As described above, a substantial amount of the first external force F1 may be transferred to the outer side surface (i.e., the first outer lubricating surface 514) and the inner side surface (i.e., the first inner lubricating surface 513) of the first contact portion 512, and a substantial amount of the second external force F2 may be transferred to the outer side surface (i.e., the second outer lubricating surface 524) and the inner side surface (i.e., the second inner lubricating surface 523) of the second contact portion 522. Accordingly, friction that occurs within the flexible display device 1 when the user moves the first body 200a relative to the second body 200b while gripping the second body 200b may be significantly reduced. In addition, the flexible display device 1 may be stably and smoothly deformed between the first state and the second state.

FIG. 14a is a view illustrating a portion of the first back cover 270 of the first body 200a of the flexible display device 1.

FIG. 14b is a cross-sectional view illustrating a portion of the flexible display device 1 in which an auxiliary roller 710 is formed.

In an embodiment of the present disclosure, the second back cover 280, which was described in detail above, may be positioned behind the first back cover 270.

The first back cover 270 may be divided into two regions with respect to the first direction (X direction). That is, the first back cover 270 may be divided into a region that is relatively close to the first edge portion 205 and a region that is relatively far from the first edge portion 205.

The first back cover 270 may be divided into a first upper region 271 and a first lower region 272. A boundary between the first upper region 271 and the first lower region 272 may be parallel to the second direction (Y direction). The first upper region 271 may be a portion of the first back cover 270 that is relatively close to the first edge portion 205, and the first lower region 272 may be a portion of the first back cover 270 that is relatively far from the first edge portion 205.

The second back cover 280 may also be divided into two regions with respect to the first direction (X direction). That is, the second back cover 280 may be divided into a region that is relatively close to the second edge portion 206 and a region that is relatively far from the second edge portion 206.

The second back cover 280 may be divided into a second upper region 281 and a second lower region 282. A boundary between the second upper region 281 and the second lower region 282 may be parallel to the second direction (Y direction). The second upper region 281 may be a portion of the second back cover 280 that is relatively far from the second edge portion 206, and the second lower region 282 may be a portion of the second back cover 280 that is relatively close to the second edge portion 206.

When viewed in the third direction (Z direction) or in a direction opposite to the third direction (Z direction), the first lower region 272 and the second upper region 281 may overlap with each other when the second body 200b is in the second position (i.e., when the flexible display device 1 is in the second state).

When viewed in the third direction (Z direction) or in the direction opposite to the third direction (Z direction), the first upper region 271 may substantially overlap with the second upper region 281, and the first lower region 272 may substantially overlap with the second lower region 282, when the second body 200b is in the first position (i.e., when the flexible display device 1 is in the first state).

The flexible display device 1 may further include an auxiliary roller 710.

The auxiliary roller 710 may be formed to extend along the second direction (Y direction). The auxiliary roller 710 may have a constant cross section along the second direction (Y direction), and may be formed in the shape of a circular roller.

A length of the auxiliary roller 710 along the second direction (Y direction) may be equal to or greater than half of a width of the flexible display device 1 (i.e., a distance from the third side edge portion 250 to the fourth side edge portion 260).

The auxiliary roller 710 may be coupled to the first back cover 270 in such a manner that the auxiliary roller 710 can rotate about a rotational axis 711 which is parallel to the second direction (Y direction). That is, the auxiliary roller 710 may be fixed to the first back cover 270 so as to be rotatable about the rotational axis 711. The auxiliary roller 710 may be coupled to the first back cover 270 such that an outer circumferential surface of the auxiliary roller 710 protrudes further backwards than an outer side surface 270a of the first back cover 270. That is, the auxiliary roller 710 may slightly protrude from the outer side surface 270a of the first back cover 270 in the direction opposite to the third direction (Z direction).

The auxiliary roller 710 may be coupled to the outer side surface 270a of the first back cover 270 at a position that is close to a boundary between the first upper region 271 and the first lower region 272.

The outer circumferential surface of the auxiliary roller 710 may come into contact with an inner side surface 280a of the second back cover 280.

In particular, the auxiliary roller 710 may come into contact with the inner side surface 280a of the second upper region 281.

Accordingly, when the flexible display device 1 is deformed between the first state and the second state, the auxiliary roller 710 may roll on the second back cover 280 in the first direction (X direction) or in the direction opposite to the first direction (X direction), while contacting the inner side surface 280a of the second back cover 280. Here, friction may be prevented from occurring between the outer side surface 270a of the first back cover 270 and the inner side surface 280a of the second back cover 280, and the flexible display device 1 may be stably deformed.

FIG. 15a is a rear view of the flexible display device 1 in the first state, and FIG. 15b is a rear view of the flexible display device 1 in the second state.

The flexible display device 1 may include auxiliary rails 611 and 612 and sliders 621 and 622.

The auxiliary rails 611 and 612 may be formed to extend along the first direction (X direction). That is, a longitudinal direction of the auxiliary rails 611 and 612 may be parallel to the first direction (X direction).

Each of the auxiliary rails 611 and 612 may have a constant cross section along the first direction (X direction). The cross section of each of the auxiliary rails 611 and 612 may have a polygonal shape or a shape other than a circle.

The auxiliary rails 611 and 612 may be fixed to the first body 200a. The auxiliary rails 611 and 612 may be fixed to the rear surface of the first body 200a.

The auxiliary rails 611 and 612 may be fixed to the first back cover 270, and in particular, may be fixed to the first lower region 272 of the first back cover 270. Accordingly, when the flexible display device 1 is viewed by a user, the auxiliary rails 611 and 612 may not be exposed to the user.

The auxiliary rails 611 and 612 may be formed such that a length of each of the auxiliary rails 611 and 612 in the first direction (X direction) is greater than the movement range (or stroke) of the second body 200b relative to the first body 200a. That is, the length of each of the auxiliary rails 611 and 612 in the first direction (X direction) may be greater than the movement distance of the second body 200b from the first position to the second position (or from the second position to the first position).

The sliders 621 and 622 may be engagingly coupled to the auxiliary rails 611 and 612 so as to reciprocate (i.e., slide) along the longitudinal direction of the auxiliary rails 611 and 612 (i.e., the first direction (X direction)). The auxiliary rails 611 and 612 and the sliders 621 and 622 may be coupled to each other in a structure of, for example, a linear motion guide (LM guide).

The sliders 621 and 622 may be fixed to the second body 200b. The sliders 621 and 622 may be fixed to the second body 200b from inside the second body 200b, and accordingly, when the flexible display device 1 is viewed by the user, the sliders 621 and 622 may not be exposed to the user.

The sliders 621 and 622 may be fixedly coupled to a middle plate 290, which forms a portion of the second body 200b, from inside the second body 200b.

The middle plate 290 may be formed in the shape of a plate that is substantially parallel to the first direction (X direction) and the second direction (Y direction). The middle plate 290 may be positioned further inside than the second back cover 280, and may be spaced apart from the second back cover 280. The second region 322 and the third region 330 of the flexible display 300 and the plurality of support bars 370 may move within a space formed between the second back cover 280 and the middle plate 290.

The auxiliary rails 611 and 612 and the sliders 621 and 622 may be provided as a pair of auxiliary rails 611 and 612 and a pair of the sliders 621 and 622. Here, the pair of auxiliary rails 611 and 612 may be symmetrical to each other with respect to the reference surface CS, and the pair of the sliders 621 and 622 may also be symmetrical to each other with respect to the reference surface CS.

The pair of auxiliary rails 611 and 612 may be spaced apart from each other along the second direction (Y direction), and the pair of the sliders 621 and 622 may be spaced apart from each other along the second direction (Y direction).

A first auxiliary rail 611 among the auxiliary rails 611 and 612 may be fixed adjacent to the first side edge portion 210, a first slider 621 among the sliders 621 and 622 may be fixed adjacent to the third side edge portion 250, a second auxiliary rail 612 among the auxiliary rails 611 and 612 may be fixed adjacent to the second side edge portion 220, and a second slider 622 among the sliders 621 and 622 may be fixed adjacent to the fourth side edge portion 260.

In an embodiment of the present disclosure, the first auxiliary rail 611 and the second auxiliary rail 612 may be positioned further inside than the first lubrication rail 510 and the second lubrication rail 520.

Accordingly, when the first external force F1 and the second external force F2 are applied, the first external force F1 and the second external force F2 may be transferred to the first lubrication rail 510 and the second lubrication rail 520 first, before being transferred to the first slider 621 and the second slider 622. Accordingly, the first body 200a may smoothly move relative to the second body 200b.

FIG. 16a is a view illustrating a cross section of a portion of the flexible display device 1 in the first state, and FIG. 16b is a cross section of a portion of the flexible display device 1 in the second state.

A first stopping groove 285 and a second stopping groove 286 may be formed on the inner side surface of the second back cover 280, and the flexible display device 1 may further include a stopper device 630.

The first stopping groove 285 and the second stopping groove 286 may be formed in a single line in the first direction (X direction), and may be spaced apart from each other.

A distance d5 between the first stopping groove 285 and the second stopping groove 286 along the first direction (X direction) may be the same as the movement range (or stroke; d2) of the second body 200b relative to the first body 200a. That is, the distance d5 between the first stopping groove 285 and the second stopping groove 286 may be the same as the movement distance (d2) of the second body 200b from the first position to the second position (or from the second position to the first position).

Each of the first stopping groove 285 and the second stopping groove 286 may be formed in the shape of a concave curved surface on the inner side surface of the second back cover 280. The first stopping groove 285 and the second stopping groove 286 may be formed in the same size and in the same shape. Each of the first stopping groove 285 and the second stopping groove 286 may be formed as a groove of a hemispherical shape.

The stopper device 630 may be fixed to the first body 200a, and may move, together with the first body 200a, relative to the second body 200b. The stopper device 630 may be fixed to the first body 200a at a position adjacent to the auxiliary rails 611 and 612, or may be fixed to an end portion of the auxiliary rails 611 and 612.

The stopper device 630 may include a stopper housing 631, a stopper 632, and a spring 633.

The stopper housing 631 may be formed in the shape of, for example, a box, a case, a container, a bracket, etc. that has a space therein. The stopper housing 631 may be formed integrally with the first body 200a, or may be independently produced and then fixedly coupled to the first body 200a.

A part of the stopper 632 may be received in the stopper housing 631, and another part of the stopper 632 may protrude outward from the stopper housing 631 in the direction opposite to the third direction (Z direction). Also, the stopper 632 may be configured to move in the third direction (Z direction) or in the direction opposite to the third direction (Z direction), with respect to the stopper housing 631. That is, the stopper 632 may be configured such that a size of the one part of the stopper 632 that is received in the stopper housing 631 and a size of the other part thereof that protrudes outward from the stopper housing 631 change.

The spring 633 may be formed as a general spring which is elastically deformed, and in an embodiment, the spring 633 may be formed as a coil spring. The spring 633 may be received within the stopper housing 631, and may elastically support the stopper 632 such that the stopper 632 protrudes outward from the stopper housing 631. In particular, the spring 633 may elastically support the stopper 632 in the direction opposite to the third direction (Z direction).

The stopper 632 may be inserted into the first stopping groove 285 when the second body 200b is in the first position, and the stopper 632 may be inserted into the second stopping groove 286 when the second body 200b is in the second position.

When the second body 200b is in the first position, the spring 633 may elastically support the stopper 632 such that an end portion of the stopper 632 is inserted into the first stopping groove 285, and accordingly, a state in which the end portion of the stopper 632 is inserted into the first stopping groove 285 may be maintained. Here, if no external force is applied thereto, the first state of the flexible display device 1 may be stably maintained.

When an external force is applied such that the second body 200b is moved from the first position to the second position (i.e., such that the flexible display device 1 is deformed from the first state to the second state), the stopper 632 may deviate from the first stopping groove 285, and when the movement of the second body 200b to the second position is completed (i.e., when the deformation of the flexible display device 1 to the second state is completed), the end portion of the stopper 632 may be inserted into the second stopping groove 286. Here, if no external force is applied thereto, the second state of the flexible display device 1 may be stably maintained.

Each of the first stopping groove 285, the second stopping groove 286, and the stopper device 630 may be provided as a pair of first stopping grooves 285, a pair of second stopping grooves 286, and a pair of stopper devices 630, which may be symmetrical to each other with respect to the reference surface CS.

As described above, according to an embodiment of the present disclosure, the first state and the second state of the flexible display device 1 may be stably maintained, and in each state, the flexible display device 1 may be stable.

FIG. 17 is view schematically illustrating how an antenna ANT is formed within the flexible display device 1 according to an embodiment of the present disclosure.

As described above, when the flexible display device 1 is provided with the first lubrication rail 510 and the second lubrication rail 520 for the relative movement between the second body 200*b* and the first body 200*a*, the coupling structure (connection structure) between the first body 200*a* and the second body 200*b* may be relatively simple, and it may be relatively easy to secure an inner space A within the first body 200*a*. Also, a main PCB to which a controller is coupled, and a battery, etc. may be easily formed in the inner space A of the first body 200*a*, and an antenna ANT may be formed in an edge portion of the first body 200*a*. The first edge portion 205, the first side edge portion 210, and the second side edge portion 220 of the first body 200*a* may provide sufficient space for the antenna ANT, and the antenna ANT, which is for 5G communications, may be formed in a portion of the first edge portion 205, the first side edge portion 210, and the second side edge portion 220.

While specific exemplary embodiments of the present disclosure have been described above and illustrated, it will be understood by those skilled in the art that the present disclosure is not limited to the described exemplary embodiments, and various changes and modifications may be made to the present disclosure without departing from the spirit and the scope of the present disclosure. Therefore, the scope of the present disclosure is not limited to the above-described exemplary embodiments, but shall be defined by the technical thought as recited in the following claims.

INDUSTRIAL APPLICABILITY

The flexible display device according to the embodiments of the present disclosure may include a pair of lubrication rails configured to facilitate contact between the first body and the second body, and thus friction that occurs in a portion in which the first body and the second body come into contact with each other may be significantly reduced. In this regard, the present disclosure has remarkable industrial applicability.

What is claimed is:

1. A flexible display device comprising:
a first body;
a second body configured to move relative to the first body in a first direction between a first position and a second position;
a flexible display including a first region fixed in front of the first body and a second region extending from the first region, wherein when the second body moves from the first position to the second position, an area of the second region that is coplanar with the first region increases;
a first lubrication rail comprising self-lubricating engineering plastic and fixed to one of the first body or the second body, wherein the first lubrication rail is configured to continuously contact the other of the first body or the second body in a first contact direction orthogonal to the first direction; and
a second lubrication rail comprising self-lubricating engineering plastic and fixed to one of the first body or the second body, wherein the second lubrication rail is configured to continuously contact the other of the first body or the second body in a second contact direction orthogonal to the first direction,
wherein:
the first body includes a first back cover configured to form a rear surface of the first body;
the second body includes a second back cover configured to form a rear surface of the second body and positioned behind the first back cover; and
the flexible display device further comprises an auxiliary roller coupled to the first back cover and rotatable about a rotational axis parallel to a second direction which is orthogonal to the first direction,
wherein an outer circumferential surface of the auxiliary roller is configured to contact an inner side surface of the second back cover.

2. The flexible display device of claim 1, wherein the first lubrication rail and the second lubrication rail are symmetrical to each other about a center line parallel to the first direction.

3. The flexible display device of claim 1, wherein the first contact direction and the second contact direction are opposite directions to each other.

4. The flexible display device of claim 1, wherein:
the first body includes a first side edge portion and a second side edge portion parallel to the first direction and configured to form edges of the flexible display device when the second body is in the second position,
the second body includes a third side edge portion and a fourth side edge portion which are positioned further laterally outward than the first side edge portion and the second side edge portion, respectively, and are configured to form edges of the flexible display device,
the first lubrication rail is fixed to an inner side surface of the third side edge portion and configured to contact the first side edge portion, and
the second lubrication rail is fixed to an inner side surface of the fourth side edge portion and configured to contact the second side edge portion.

5. The flexible display device of claim 4, wherein:
the first side edge portion comprises:
a first outer side wall formed along the first direction; and
a first inner side wall formed along the first direction and positioned further laterally inward than the first outer side wall;
the second side edge portion comprises:
a second outer side wall formed along the first direction; and
a second inner side wall formed along the first direction and positioned further laterally inward than the second outer side wall,
the first lubrication rail comprises:
a first neck portion fixed to the third side edge portion and extending inward; and
a first contact portion extending from the first neck portion at an angle and interposed between the first outer side wall and the first inner side wall, and
the second lubrication rail comprises:
a second neck portion fixed to the fourth side edge portion and extending inward; and a second contact portion extending from the second neck portion at an angle and interposed between the second outer side wall and the second inner side wall.

6. The flexible display device of claim 5, wherein the first neck portion and the second neck portion are parallel to the first region, and the first contact portion and the second contact portion are orthogonal to the first region.

7. The flexible display device of claim 5, wherein the first contact portion contacts the first outer side wall and the first inner side wall, and the second contact portion contacts the second outer side wall and the second inner side wall.

8. The flexible display device of claim 5, wherein the inner side surface of the third side edge portion contacts an outer side surface of the first outer side wall, and the inner side surface of the fourth side edge portion contacts an outer side surface of the second outer side wall.

9. The flexible display device of claim 1, wherein:
the second body includes a third side edge portion and a fourth side edge portion which are formed along the first direction and are configured to form edges of the flexible display device,
the first lubrication rail is fixed to an inner side surface of the third side edge portion and configured to contact the first body,
the second lubrication rail is fixed to an inner side surface of the fourth side edge portion and configured to contact the first body, and
a height of each of the first lubrication rail and the second lubrication rail is ⅕ to ½ of a thickness of the flexible display device.

10. The flexible display device of claim 1, wherein:
the second body includes a third side edge portion and a fourth side edge portion which are formed along the first direction and are configured to form edges of the flexible display device,
the first lubrication rail is fixed to an inner side surface of the third side edge portion and configured to contact the first body,
the second lubrication rail is fixed to an inner side surface of the fourth side edge portion and configured to contact the first body, and
a length of each of the first lubrication rail and the second lubrication rail in the first direction is greater than or equal to 80% of a length of each of the third side edge portion and the fourth side edge portion.

11. The flexible display device of claim 1, further comprising:
a first stopping groove and a second stopping groove, each having a hemispherical shape, spaced apart from each other on the inner side surface of the second back cover; and
a stopper device fixed to the first body and comprising:
a stopper configured to engage with the first stopping groove when the second body is in the first position and engage with the second stopping groove when the second body is in the second position; and
a spring configured to provide a biasing force to the stopper toward the second back cover.

12. The flexible display device of claim 11, wherein the first stopping groove is provided as a pair of first stopping grooves, the second stopping groove is provided as a pair of second stopping grooves, and the stopper device is provided as a pair of stopper devices, to be respectively symmetrical to each other with respect to the center line.

13. The flexible display device of claim 1, further comprising:

auxiliary rails parallel to the first direction and fixed to the first body; and
sliders fixed to the second body and configured to respectively slide along the auxiliary rails, wherein each auxiliary rail is positioned further laterally inward than the first lubrication rail and the second lubrication rail, respectively.

14. The flexible display device of claim 1, wherein:
the second body further comprises a support extending along the second direction;
the second region includes a first connected region extending from the first region and a second connected region extending from the first connected region;
when the second body is in the first position, the first connected region is curved around the support to form a curved surface and a plane of the second connected region is parallel to a plane of the first region, and
when the second body is in the second position, the first connected region is coplanar with the first region, and a portion of the second connected region is curved around the support to form a curved surface.

15. A flexible display device comprising:
a first body;
a second body configured to move relative to the first body in a first direction between a first position and a second position;
a flexible display including a first region fixed in front of the first body and a second region extending from the first region, wherein when the second body moves from the first position to the second position, an area of the second region that is coplanar with the first region increases;
a pair of lubrication rails comprising polyoxymethylene (POM) and fixed to the second body and configured to contact the first body, wherein each lubrication rail is configured to have a constant cross section shape along the first direction;
wherein the pair of lubrication rails are symmetrical to each other with respect to a center line parallel to the first direction,
wherein:
the first body includes a first back cover configured to form a rear surface of the first body;
the second body includes a second back cover configured to form a rear surface of the second body and positioned behind the first back cover; and
the flexible display device further comprises an auxiliary roller coupled to the first back cover and rotatable about a rotational axis parallel to a second direction which is orthogonal to the first direction,
wherein an outer circumferential surface of the auxiliary roller is configured to contact an inner side surface of the second back cover.

16. The flexible display device of claim 15, wherein:
the first body includes a first side edge portion and a second side edge portion parallel to the first direction and configured to form edges of the flexible display device when the second body is in the second position,
the second body includes a third side edge portion and a fourth side edge portion which are positioned further laterally outward than the first side edge portion and the second side edge portion, respectively, and are configured to form edges of the flexible display device,
a first lubrication rail of the pair of lubrication rails is fixed to an inner side surface of the third side edge portion and configured to contact the first side edge portion, and a second lubrication rail of the pair of lubrication rails is fixed to an inner side surface of the fourth side edge portion and configured to contact the second side edge portion.

17. The flexible display device of claim 15, further comprising:
- a first stopping groove and a second stopping groove, each having a hemispherical shape, are spaced apart from each other on the inner side surface of the second back cover; and
- a stopper device fixed to the first body and comprising:
- a stopper configured to engage with the first stopping groove when the second body is in the first position and engage with the second stopping groove when the second body is in the second position; and
- a spring configured to provide a biasing force to the stopper toward the second back cover.

18. The flexible display device of claim 15, further comprising a plurality of support bars extending in the second direction and fixed to an inner surface of the second region of the flexible display,
wherein each of the plurality of support bars comprises:
- a first support slider at one end;
- a second support slider at the other end; and
- a connection arm connecting the first support slider to the second support slider and configured to support the second region, wherein the second body comprises:
- a first movement guide groove formed as a U-shaped groove and defining a path through which the first support slider moves; and
- a second movement guide groove formed as a U-shaped groove and defining a path through which the second support slider moves.

* * * * *